United States Patent
Todaka et al.

(10) Patent No.: US 11,322,985 B2
(45) Date of Patent: May 3, 2022

(54) WIRELESS POWER TRANSFER SYSTEM, POWER TRANSMISSION APPARATUS, AND POWER RECEPTION APPARATUS

(71) Applicant: Maxell, Ltd., Kyoto (JP)

(72) Inventors: Yoshihiro Todaka, Kyoto (JP); Atsushi Tanaka, Kyoto (JP); Hiroshi Ido, Kyoto (JP)

(73) Assignee: Maxell, Ltd., Kyoto (JP)

( * ) Notice: Subject to any disclaimer, the term of this patent is extended or adjusted under 35 U.S.C. 154(b) by 19 days.

(21) Appl. No.: 16/645,551

(22) PCT Filed: Mar. 13, 2018

(86) PCT No.: PCT/JP2018/009687
§ 371 (c)(1),
(2) Date: Mar. 9, 2020

(87) PCT Pub. No.: WO2019/053924
PCT Pub. Date: Mar. 21, 2019

(65) Prior Publication Data
US 2020/0280213 A1    Sep. 3, 2020

(30) Foreign Application Priority Data
Sep. 14, 2017    (JP) .............................. JP2017-176951

(51) Int. Cl.
*B60L 53/12* (2019.01)
*B60L 53/51* (2019.01)
(Continued)

(52) U.S. Cl.
CPC .............. *H02J 50/12* (2016.02); *B60L 53/12* (2019.02); *B60L 53/51* (2019.02); *H02J 7/06* (2013.01);
(Continued)

(58) Field of Classification Search
USPC .......................................................... 307/104
See application file for complete search history.

(56) References Cited

U.S. PATENT DOCUMENTS

| | | | | |
|---|---|---|---|---|
| 2012/0127765 A1* | 5/2012 | Maruyama | .............. | H02J 50/12 363/126 |
| 2014/0292092 A1* | 10/2014 | Ichinose | ............... | H02M 7/219 307/104 |
| 2015/0115734 A1* | 4/2015 | Tawaragi | ............. | G01R 21/007 307/104 |
| 2018/0062430 A1* | 3/2018 | Matsumoto | ........... | B60L 53/122 |

FOREIGN PATENT DOCUMENTS

| | | |
|---|---|---|
| JP | 2012-125138 A | 6/2012 |
| JP | 2012-244635 A | 12/2012 |

(Continued)

OTHER PUBLICATIONS

International Search Report, issued in PCT/JP2018/009687, PCT/ISA/210, dated Apr. 10, 2018.

*Primary Examiner* — Toan T Vu
*Assistant Examiner* — Xuan Ly
(74) *Attorney, Agent, or Firm* — Birch, Stewart, Kolasch & Birch, LLP

(57) ABSTRACT

A wireless power transfer system can be achieved at a low cost, can be used as both a power transmission apparatus and a power reception apparatus, and can cope with a change in coupling coefficient of a resonant coil of the power transmission apparatus and a resonant coil of the power reception apparatus. The wireless power transfer system is a power transmission apparatus that is able to perform bidirectional wireless power transmission, and includes the following: a power supply; a switching circuit that includes a plurality of switching devices; a resonator that includes a coil and a capacitor; a drive control circuit that controls an ON/OFF operation of each switching device of the switching circuit;

(Continued)

and a detector that detects a resonance current flowing through the switching circuit. The drive control circuit controls the ON/OFF of each switching device of the switching circuit to perform a power transmission operation or a power reception operation based on a resonant current waveform detected by the detector.

11 Claims, 15 Drawing Sheets

(51) Int. Cl.
*H02J 50/12* (2016.01)
*H02J 50/80* (2016.01)
*H02J 7/16* (2006.01)
*H02J 7/06* (2006.01)
*H02M 7/81* (2006.01)

(52) U.S. Cl.
CPC .............. *H02J 50/80* (2016.02); *H02M 7/81* (2013.01); *H02J 2207/40* (2020.01)

(56) References Cited

FOREIGN PATENT DOCUMENTS

| | | | |
|---|---|---|---|
| JP | 2014-195387 A | | 10/2014 |
| JP | 2016-32345 A | | 3/2016 |
| JP | 2016032345 | * | 7/2016 |
| JP | 6038386 B1 | | 12/2016 |
| WO | WO 2014/010049 A1 | | 1/2014 |

* cited by examiner

WIRELESS POWER TRANSFER SYSTEM, POWER TRANSMISSION APPARATUS, AND POWER RECEPTION APPARATUS

TECHNICAL FIELD

The present disclosure relates to a wireless power transfer system that transmits power by a magnetic field resonance generated between a power transmission coil of a power transmission apparatus used on the power transmission side and a power reception coil of a power transmission apparatus used on the power reception side. In particular, the present disclosure relates to a wireless power transfer system that is able to perform bidirectional power transmission, a power transmission apparatus, and a power reception apparatus.

BACKGROUND ART

A magnetic field resonance type wireless power transfer system includes a resonant circuit having a coil and a capacitor, and transmits power in a wireless manner using a magnetic coupling generated between a power transmission coil of a power transmission apparatus and a power reception coil of a power reception apparatus. Such a wireless power transfer system has been widely used as, e.g., a charging device for a vehicle-mounted battery of electric vehicles or a charger for a secondary battery that serves as an operating power supply of various electronic devices, particularly portable electronic devices.

In one aspect of the wireless power transfer system, the power transmission apparatus used on the power transmission side and the power transmission apparatus used on the power reception side have been determined in advance, and power is transmitted in only one direction. In addition to this, a bidirectional wireless power transfer system has been proposed that can perform bidirectional wireless power transmission and reception between two power transmission apparatuses.

Patent Document 1 proposes a bidirectional wireless power transfer system that includes the following: a bidirectional resonant circuit having a switch for switching between a series connection and a parallel connection of resonant coils and capacitors; a power conversion device that is operated as an inverter and a converter; a buck-boost converter; and a switch for switching between a power conversion DC power supply and a load circuit. The resonant coils and the capacitors are connected in series in a power transmission apparatus and are connected in parallel in a power reception apparatus.

Patent Document 2 proposes a bidirectional wireless power transfer system including a power transmission apparatus and a power reception apparatus, each of which includes a resonator in which a resonant coil and a capacitor are connected in series, a full bridge inverter in which FETs are bridge-connected, and a bidirectional buck-boost DD converter. In the power transmission apparatus, a power transmission inverter is driven at a voltage lower than the power supply voltage. In the power reception apparatus, a full bridge detector is formed by using, e.g., body diodes of FETs of the full bridge inverter, and the voltage is raised from the detected voltage and transmitted to the load, so that the detected voltage is reduced, resulting in high efficiency. In the bidirectional wireless power transfer system of Patent Document 2, the series resonant circuit is provided in both the power transmission apparatus and the power reception apparatus. Thus, a soft start can be performed while suppressing the current at the start of power transmission. Moreover, when an excessive current flows through the power reception apparatus, the output from the power reception apparatus can be suspended only by the operation of the power reception apparatus, and at the same time the transmitted power can be reduced by increasing the output impedance of the inverter of the power transmission apparatus.

PRIOR ART DOCUMENTS

Patent Documents

Patent Document 1: JP 2012-244635 A
Patent Document 2: JP 6038386 B1

DISCLOSURE OF INVENTION

Problem to be Solved by the Invention

The bidirectional wireless power transfer system of Patent Document 1 requires, as the bidirectional resonant circuit, a series resonant circuit in which the capacitors are connected in series and a parallel resonant circuit in which the capacitors are connected in parallel. Thus, the circuit configuration, including the switch for the switching operation, becomes complicated. This may lead to an increase in cost and a problem of durability.

In the bidirectional wireless power transfer system of Patent Document 2, since the series resonant circuit is provided in both the power transmission apparatus and the power reception apparatus, the resonance needs to be performed in accordance with the drive frequency, and L and C of the resonant circuits have to be set to predetermined values. However, in the wireless power transfer system, the coupling coefficient of the two coils may vary due to, e.g., a change in the distance between the resonant coils of the power transmission apparatus and the power reception apparatus or the presence of, e.g., metal foreign matter between the resonant coils of the respective devices. Thus, in order to efficiently transmit power at a high voltage, the values of L and C of the resonant circuits should be made variable to cope with a variation in the coupling coefficient. When power is transmitted at a high voltage, the power supply system needs to be a high voltage system, while the control circuit and logic circuit for controlling power transmission and power reception will be a low voltage system. Thus, the circuit configuration becomes complicated. This may lead to an increase in cost of the wireless power transfer system as a whole.

It is an object of the present disclosure to solve the above conventional problems and to provide a wireless power transfer system that can be achieved at a low cost, that can be used as both a power transmission apparatus and a power reception apparatus, and that can cope with a change in coupling coefficient of a resonant coil of the power transmission apparatus and a resonant coil of the power reception apparatus. It is also an object of the present disclosure to provide a power transmission apparatus and a power reception apparatus that make full use of the advantages of the wireless power transfer system.

Means for Solving Problem

A wireless power transfer system of the present disclosure is a power transmission apparatus that is able to perform bidirectional wireless power transmission. The wireless power transfer system includes the following: a power supply; a switching circuit that includes a plurality of switching devices; a resonator that includes a coil and a capacitor; a drive control circuit that controls an ON/OFF operation of each switching device of the switching circuit; and a detector that detects a resonance current flowing through the switching circuit. The drive control circuit controls the ON/OFF of each switching device of the switching circuit to perform a power transmission operation or a power reception operation based on a resonant current waveform detected by the detector.

Effects of the Invention

In the wireless power transfer system of the present disclosure, the current detector detects a resonance current flowing through the resonator having the resonant coil and the resonant capacitor as a current flowing through the switching circuit, and then the drive control circuit controls the ON/OFF operation of each switching device of the switching circuit based on the detected resonant current waveform. This simple configuration allows the wireless power transfer system to function as both a power transmission apparatus and a power reception apparatus. Moreover, based on the resonant current waveform detected by the detector, the power transmission apparatus and the power reception apparatus each can perform the power transmission operation with higher efficiency.

DESCRIPTION OF THE INVENTION

Figure 1:
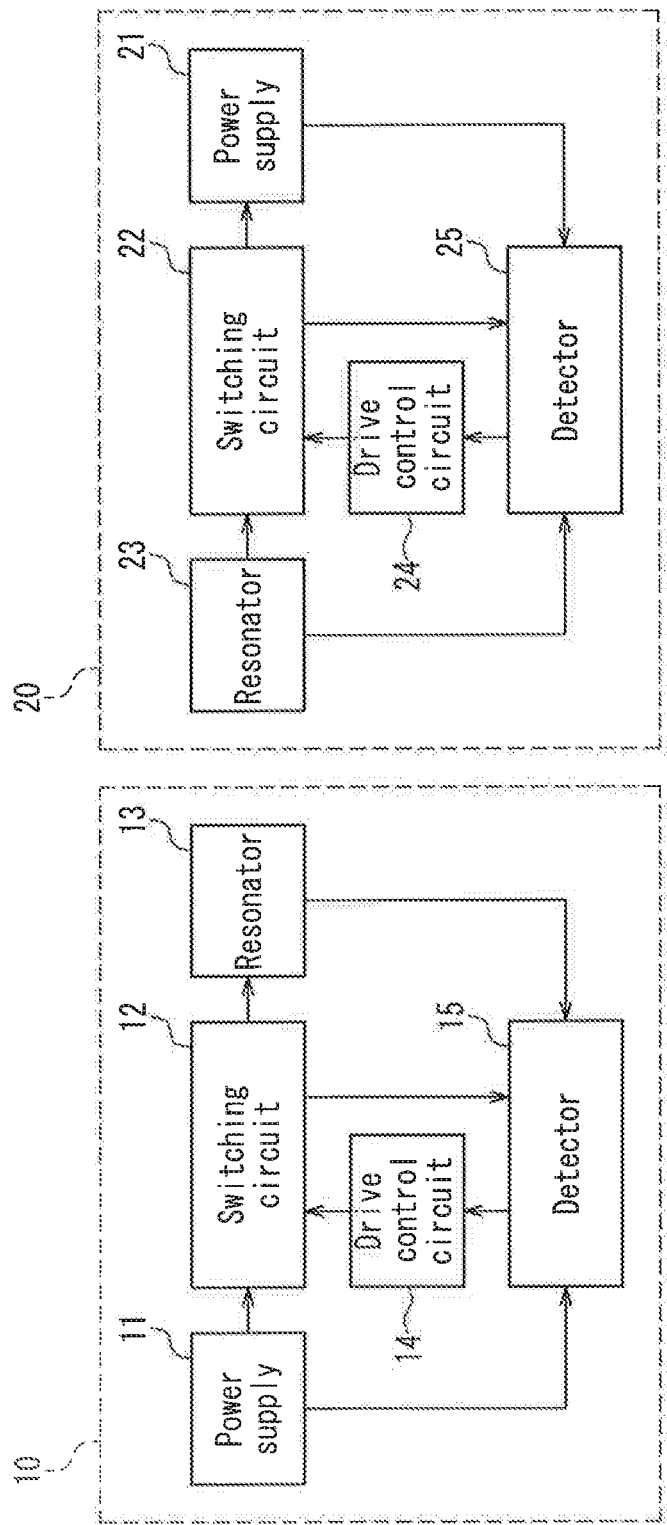
FIG. 1 is a block diagram showing schematic configurations of a power transmission apparatus and a power reception apparatus using a wireless power transfer system of this embodiment.

A wireless power transfer system of the present disclosure is a power transmission apparatus that is able to perform bidirectional wireless power transmission. The wireless power transfer system includes the following: a power supply; a switching circuit that includes a plurality of switching devices; a resonator that includes a coil and a capacitor; a drive control circuit that controls an ON/OFF operation of each switching device of the switching circuit; and a detector that detects a resonance current flowing through the switching circuit. The drive control circuit controls the ON/OFF of each switching device of the switching circuit to perform a power transmission operation or a power reception operation based on a resonant current waveform detected by the detector.

In the wireless power transfer system of the present disclosure, the detector detects a resonance current flowing through the resonator having the resonant coil and the resonant capacitor as a current flowing through the switching circuit that is connected to the resonator, and then the drive control circuit controls the ON/OFF operation of each switching device of the switching circuit based on the detected resonant current waveform. This simple configuration allows the wireless power transfer system to function as both a power transmission apparatus and a power reception apparatus that have the same configuration. Moreover, based on the resonant current waveform detected by the detector, the power transmission apparatus and the power reception apparatus each can control the power transmission operation with higher efficiency and safety.

When the wireless power transfer system of the present disclosure is used as a power transmission apparatus, it is preferable that the drive control circuit controls the ON/OFF operation of each switching device to supply a current in a predetermined direction from the switching circuit to the resonator in accordance with a phase of the resonant current waveform detected by the detector. This configuration can increase the voltage to be applied to a power transmission (primary) resonator according to the resonant current waveform of a power transmission coil that is magnetically coupled to a power reception coil of a power reception apparatus. Thus, the resonance current flowing through the resonator can be increased in a self-excited manner.

When the wireless power transfer system of the present disclosure is used as a power transmission apparatus, it is preferable that the drive control circuit controls a pulse width of a drive pulse for controlling the ON/OFF operation of each switching device to be short in accordance with a phase of the resonant current waveform detected by the detector. With this PWM (pulse width modulation) control, the power transmission apparatus can reduce power consumption and perform variable control of the transmitted power.

When the wireless power transfer system of the present disclosure is used as a power transmission apparatus, it is preferable that the drive control circuit suspends the transmission of power from the resonator by turning ON only any of the switching devices located on either the power supply side or a ground side of the switching circuit. This configuration can continue to detect the resonant current waveform required for controlling the wireless power transfer system while the transmission of power is suspended.

When the wireless power transfer system of the present disclosure is used as a power transmission apparatus, it is preferable that the drive control circuit controls the ON/OFF operation of each switching device to supply a current from the resonator to the switching circuit in accordance with a phase of the resonant current waveform detected by the detector. This configuration can return the remaining power in the resonator of the power transmission apparatus back to the power supply. In particular, when the power supply is a secondary battery, this configuration can restore the battery capacity of the secondary battery.

When the wireless power transfer system of the present disclosure is used as a power reception apparatus, it is preferable that the drive control circuit controls the ON/OFF operation of each switching device to rectify a current output from the resonator in accordance with the phase of the resonant current waveform detected by the detector. This configuration can avoid voltage drops at diodes of the switching devices of the switching circuit and can reduce power loss in the power reception apparatus.

When the wireless power transfer system of the present disclosure is used as a power reception apparatus, it is preferable that the drive control circuit suspends the reception of power by the resonator by turning ON only any of the switching devices located on either the power supply side or the ground side of the full-bridge circuit (inverter). This configuration can interrupt the received power to be supplied to, e.g., a secondary battery used as the power supply of the power reception apparatus or the connected load, and can also continue to detect the resonant current waveform required for controlling the wireless power transfer system.

When the wireless power transfer system of the present disclosure is used as a power reception apparatus, it is preferable that the drive control circuit controls the ON/OFF operation of each switching device to supply a current from the switching circuit to the resonator in accordance with the phase of the resonant current waveform detected by the detector. This configuration can return the remaining power in the power reception apparatus back to the power transmission apparatus. When the wireless power transfer system of the present disclosure is used as the power transmission apparatus, and the power supply of the power transmission apparatus is a secondary battery, the power transmission apparatus may detect the transmission of power from the power reception apparatus and perform the same operation as a charging circuit, thereby contributing to the recovery of the battery capacity.

In the wireless power transfer system of the present disclosure, it is preferable that the detector detects a current flowing through the switching devices located on the ground side of the switching circuit. With this configuration, the voltage applied to the detector to detect the resonance current can be kept low, and thus the cost can be reduced.

As described above, the detection of the current flowing through the switching devices located on the ground side allows the voltage applied to the detector to be kept low. In this case, it is preferable that only the switching devices located on the ground side are turned ON when the drive control circuit suspends the transmission of power from the resonator, in order to detect the resonance current even in the suspended state. Needless to say, when a circuit for detecting the resonance current is provided on the power supply side, it is preferable that the switching devices located on the power supply side are turned ON to detect the resonance current, the details of which will be described later.

A power transmission apparatus of the present disclosure transmits power in a wireless manner and includes the following: a power supply; a switching circuit that includes a plurality of switching devices; a power transmission resonator that includes a coil and a capacitor; a drive control circuit that controls an ON/OFF operation of each switching device of the switching circuit; and a detector that detects a resonance current flowing through the switching circuit. The drive control circuit controls the ON/OFF of each switching device of the switching circuit to perform a power transmission operation based on a resonant current waveform detected by the detector.

A power reception apparatus of the present disclosure receives power in a wireless manner and includes the following: a power supply; a switching circuit that includes a plurality of switching devices; a power reception resonator that includes a coil and a capacitor; a drive control circuit that controls an ON/OFF operation of each switching device of the switching circuit; and a detector that detects a resonance current flowing through the switching circuit. The drive control circuit controls the ON/OFF of each switching device of the switching circuit to perform a power reception operation based on a resonant current waveform detected by the detector.

Hereinafter, embodiments of the wireless power transfer system of the present disclosure will be described in detail with reference to the drawings.

In the following embodiments, the wireless power transfer system has a double function as a power transmission apparatus on the power transmission side and a power reception apparatus on the power reception side, and can perform bidirectional power transmission. Therefore, the wireless power transfer system will be described separately for the power transmission apparatus and the power reception apparatus as appropriate.

(Embodiments)

Figure 2:
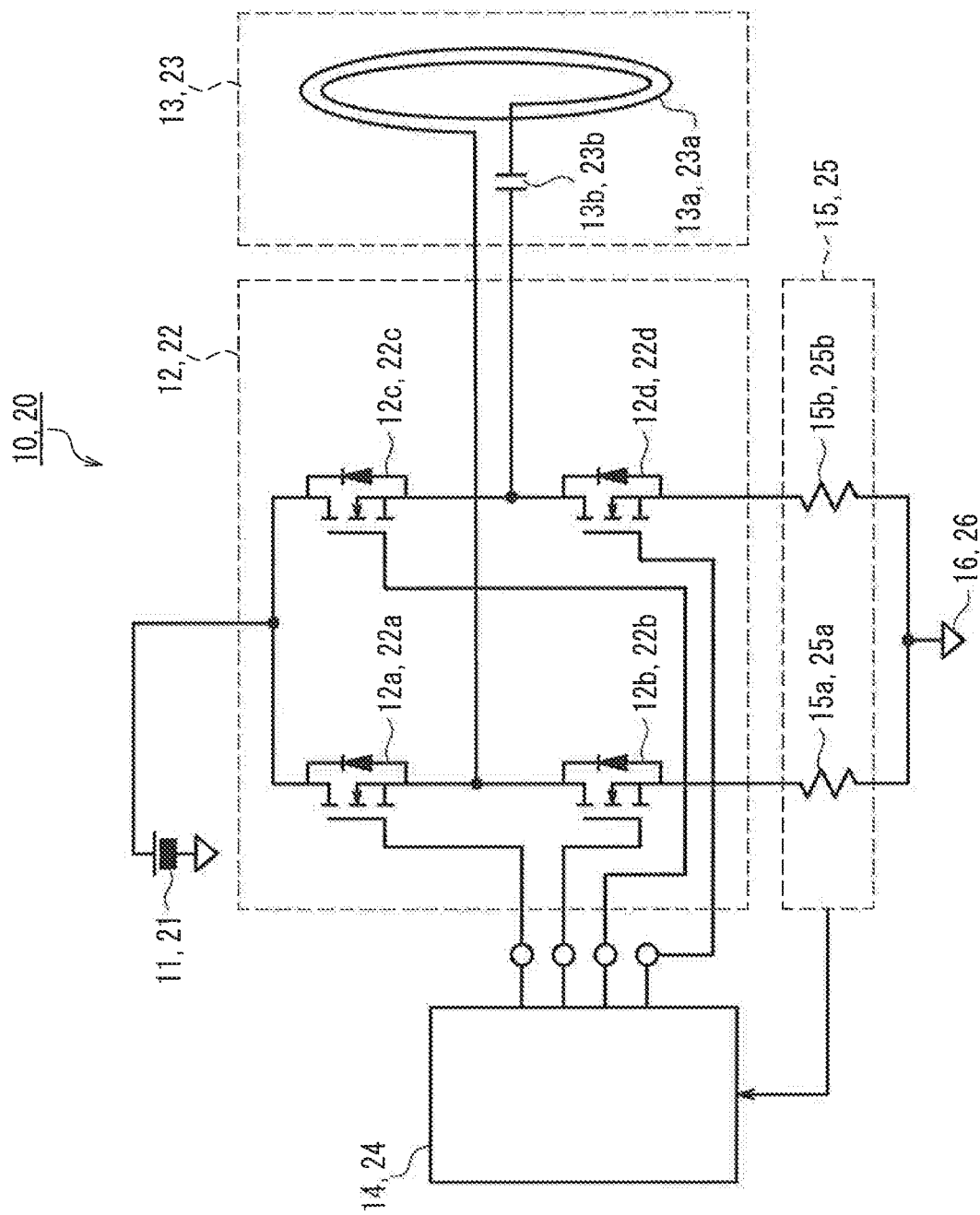
FIG. 2 is a circuit block diagram showing a configuration of a wireless power transfer system of this embodiment.

FIGS. 1 and 2 are block diagrams showing a schematic configuration of a wireless power transfer system of this embodiment. In FIG. 1, the wireless power transfer system is used as both a power transmission apparatus and a power reception apparatus, and power is transmitted and received between them. FIG. 2 shows in more detail the main portion of the wireless power transfer system that functions as both the power transmission apparatus and the power reception apparatus.

As shown in FIG. 1, a power transmission apparatus 10 includes a power supply 11 for operating the entire device, a switching circuit 12 that performs a switching operation to transmit power, a power transmission (primary) resonator 13 that converts the transmitted power to a magnetic field, a drive control circuit 14 that controls the operation of switching devices of the switching circuit 12, and a detector 15 that detects a resonance current in the power transmission (primary) resonator 13 from the current flowing through the switching circuit 12.

A power reception apparatus 20 includes a power supply 21 for operating the entire device, a switching circuit 22 that rectifies and converts the received power to a DC voltage, a power reception (secondary) resonator 23 that receives the transmitted power by a magnetic coupling with the power transmission (primary) resonator 13 of the power transmission apparatus 10, a drive control circuit 24 that operates the switching circuit 22, and a detector 25 that detects a resonance current in the power reception (secondary) resonator 23 from the current flowing through the switching circuit.

As shown in FIG. 2, in the wireless power transfer system serving as both the power transmission apparatus 10 and the power reception apparatus 20, the power supplies 11, 21 may be, e.g., a DC power supply in the power transmission apparatus 10 and a chargeable/dischargeable secondary battery in the power reception apparatus 20, respectively. The secondary battery that has been charged as the power supply 21 of the power reception apparatus 20 may also be used as the power supply 11 of the power transmission apparatus 10 by switching between the power transmission apparatus and the power reception apparatus. In this case, the power supply 11 can be the charged secondary battery. When the power reception apparatus 20 functions as a power supply of an electronic device to which the power reception apparatus 20 is connected, the power supply 21 of the power reception apparatus 20 corresponds to a circuit of the electronic device that serves as a load of the power reception apparatus 20.

In FIGS. 1 and 2, for convenience, the power supplies 11, 21 are shown as being able to supply the DC voltage such as the charged secondary battery. When the wireless power transfer system of this embodiment is used as the power reception apparatus 20, in particular, the power supply 21 may be either a load that consumes power or a power source that supplies power. Thus, the power supply 21 can have various forms that are feasible for bidirectional power transmission.

Moreover, for convenience, the power supply 21 of the power reception apparatus 20 is described as functioning as a power source from the beginning. However, when the power supply 21 is a secondary battery, there may be no power in the secondary battery at the time power starts to be transmitted from the power transmission apparatus 10. In such a case, the circuit may be configured such that power transmitted from the power transmission apparatus 10 to the resonator 23 of the power reception apparatus 20 can be used as a driving power supply of the power reception apparatus 20.

As shown in FIG. 2, the power transmission apparatus 10 and the power reception apparatus 20 include full-bridge circuits (inverters) 12, 22 as the switching circuits, respectively.

The full-bridge circuit (inverter) 12, 22 includes a series of a first switching device (12a, 22a) and a second switching device (12b, 22b) and a series of a third switching device (12c, 22c) and a fourth switching device (12d, 22d), and the two series are connected in parallel. The full-bridge circuit (inverter) 12, 22 is placed between the power supply 11, 21 and a ground 16, 26.

The first to fourth switching devices (12a to 12d, 22a to 22d) may be composed of MOSFETs, and the ON/OFF of each switching device is individually controlled by a drive voltage from the drive control circuit 14, 24. When the switching devices (12a to 12d, 22a to 22d) are MOSFETs, all the body diodes of the MOSFETs are arranged in the direction in which a current only flows from the ground 16, 26 to the power supply 11, 21. Consequently, if the first to fourth switching devices (12a to 12d, 22a to 22d) are in the OFF state and do not operate, the full-bridge circuit (inverter) 12, 22 will function as a full-wave rectifier including four diodes.

Both the power transmission (primary) resonator 13 and the power reception (secondary) resonator 23 are configured as a series resonant circuit in which a resonant coil 13a, 23a and a resonant capacitor 13b, 23b are connected in series. In the above full-bridge circuit (inverter) 12, 22, there are two sets of MOSFETs with each set having the upper and lower MOSFETs that are connected in series to form a bridge circuit. The resonant circuit (i.e., the power transmission (primary) resonator 13 and the power reception (secondary) resonator 23) is connected to the portion connecting the source and the drain of each bridge circuit.

In FIG. 2, the power transmission (primary) resonator 13 and the power reception (secondary) resonator 23 are shown as the series resonant circuit in which the resonant coil 13a, 23a and the resonant capacitor 13b, 23b are connected in series. The power transmission (primary) resonator 13 and the power reception (secondary) resonator 23 may also be configured as a parallel resonant circuit in which the resonant coil 13a, 23a and the resonant capacitor 13b, 23b are connected in parallel. However, this configuration requires an inductance to be inserted in series, since the output from the full-bridge circuit (inverter) is directly supplied to the resonant capacitor 13b, 23b, resulting in a large current flow.

The drive control circuit 14, 24 controls the ON/OFF operation of each of the switching devices (12a to 12d, 22a to 22d) of the full-bridge circuit (inverter) 12, 22 with predetermined timing based on the resonant current waveform of the resonant circuit detected by the detector 15, 25, as will be described later.

In the power transmission apparatus 10, the drive control circuit 14 operates the full-bridge circuit (inverter) 12 as an inverter circuit to produce an AC current that is to be applied to the power transmission (primary) resonator 13. Moreover, the drive control circuit 14 controls the ON/OFF operation of each of the switching devices (12a to 12d) of the full-bridge circuit (inverter) 12 with predetermined timing when the power transmission apparatus 10 performs self-oscillation or PWM control to improve power transmission efficiency, and when the power transmission apparatus 10 controls a suspend operation to reduce the transmitted power or performs a recovery operation to recover surplus power, as will be described later.

In the power reception apparatus 20, the drive control circuit 24 keeps the switching devices (22a to 22d) of the full-bridge circuit (inverter) 22 in the OFF state when full-wave rectification is performed with the diodes contained in the switching devices of the full-bridge circuit (inverter) 22. Moreover, the drive control circuit 24 controls the ON/OFF operation of each of the switching devices (22a to 22d) of the full-bridge circuit (inverter) 22 with predetermined timing when the power reception apparatus 20 performs synchronous rectification to improve power transmission efficiency or a recovery operation to return power from the power reception apparatus 20 to the power transmission apparatus 10, as will be described later.

In the wireless power transfer system of this embodiment, the detector 15, 25 detects the current flowing through each of the lower switching devices of the switching devices constituting the full-bridge circuit (inverter) 12, 22. For example, the detector 15, 25 may have a first resistor (15a, 25a) and a second resistor (15b, 25b). The first resistor (15a, 25a) is used to detect the current flowing through the lower switching device (12b, 22b) in the bridge circuit, which is formed by connecting the first switching device (12a, 22a) and the second switching device (12b, 22b). The second resistor (15b, 25b) is used to detect the current flowing through the lower switching device (12d, 22d) in the bridge circuit, which is formed by connecting the third switching device (12c, 22c) and the fourth switching device (12d, 22d).

In the detector 15, 25, waveforms of the currents flowing through the two lower switching devices of the full-bridge circuit (inverter), which are detected by the first resistor (15a, 25a) and the second resistor (15b, 25b), respectively, are subjected to appropriate processes such as an inverting process and a synthesis process to obtain the waveform of the resonance current flowing through the power transmission (primary) resonator 13 or the power reception (secondary) resonator 23.

The detector 15, 25 transfers the information about the detected waveform of the resonance current flowing through the full-bridge circuit (inverter) 12, 22 and the voltage value determined based on the current waveform to the drive control circuit 14, 24. Such information is used to control the operation of the drive control circuit 14, 24.

FIG. 2 shows an example of the detector 15, 25 in which the resistors (15a, 25a and 15b, 25b) are located on the ground 16 side of the full-bridge circuit (inverter) 12, 22 to detect the currents flowing through the second switching device (12b, 22b) and the fourth switching device (12d, 22d), respectively, which are located on the ground 16 side of the full-bridge circuit (inverter) 12, 22. In this embodiment, the detector 15, 25 may be configured to detect the currents flowing through the respective switching devices (12a, 22a and 12c, 22c) located on the power supply 11, 21 side of the full-bridge circuit (inverter) 12, 22. In this case, the current detection resistors need to be provided between each of the switching devices (12a, 22a and 12c, 22c) and the power supply 11, 21. Thus, a high voltage will be superimposed on the resistor outputs themselves, although a signal change is small. This requires the detector 15, 25 to be made up of electronic components having a high withstand voltage. For example, when the wireless power transfer system of this embodiment serves to transmit power to charge or discharge a battery of an electric vehicle, the power supply voltage can reach several hundred volts. The use of electronic components that can withstand such a high voltage may increase the cost of the detector 15, 25. Therefore, it is more preferable that the detector 15, 25 is configured to detect the currents flowing through the respective switching devices (12b, 22b and 12d, 22d) located on the ground 16 side of the full-bridge circuit (inverter) 12, 22.

The withstand voltage of the electronic components of the detector 15, 25 may be reduced by, e.g., providing a separate power supply for operating the detector 15, 25 on the high voltage side. However, the drive control circuit 14, 24 is usually provided on the low voltage side. Therefore, it is necessary, e.g., to perform a voltage shift or to provide another power supply, which may lead to an increase in cost and a complicated circuit configuration.

Figure 3:
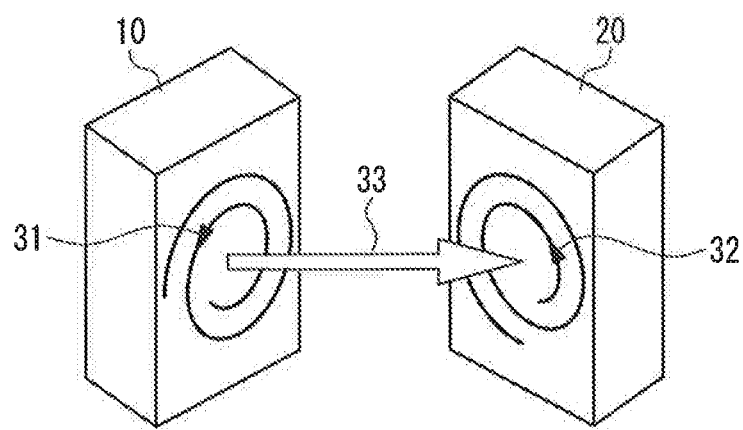
FIG. 3 is an image diagram showing the state of transmission of power with wireless power transfer systems of this embodiment.

FIG. 3 is an image diagram showing the state of transmission and reception of power between wireless power transfer systems of this embodiment.

As shown in FIG. 3, the wireless power transfer system of this embodiment is used as both the power transmission apparatus 10 and the power reception apparatus 20, and power is transmitted and received between them. In this case, when a current flows through the coil of the power transmission apparatus 10 in the direction of the arrow 31 (see FIG. 3), a magnetic field generated in this coil has a flux linkage with the coil of the power reception apparatus 20, and then an electromotive force is generated in the coil of the power reception apparatus 20 to cancel the magnetic field, so that a current flows in the direction of the arrow 32 (see FIG. 3). Since the power transmission apparatus 10 and the power reception apparatus 20 have the same configuration, the direction of the magnetic lines of force for the flux linkage in the power transmission apparatus is opposite to the direction of the electromotive force in the power reception apparatus. However, the resonant coil 13a of the power transmission (primary) resonator 13 of the power transmission apparatus 10 is magnetically coupled to the resonant coil 23a of the power reception (secondary) resonator 23 of the power reception apparatus 20, and thus wireless power transmission 33 from the power transmission apparatus 10 to the power reception apparatus 20 can be achieved.

[Operation of Power Transmission Apparatus]

Next, the operation of the wireless power transfer system of this embodiment that is used as a power transmission apparatus will be described in detail.

Figure 4:
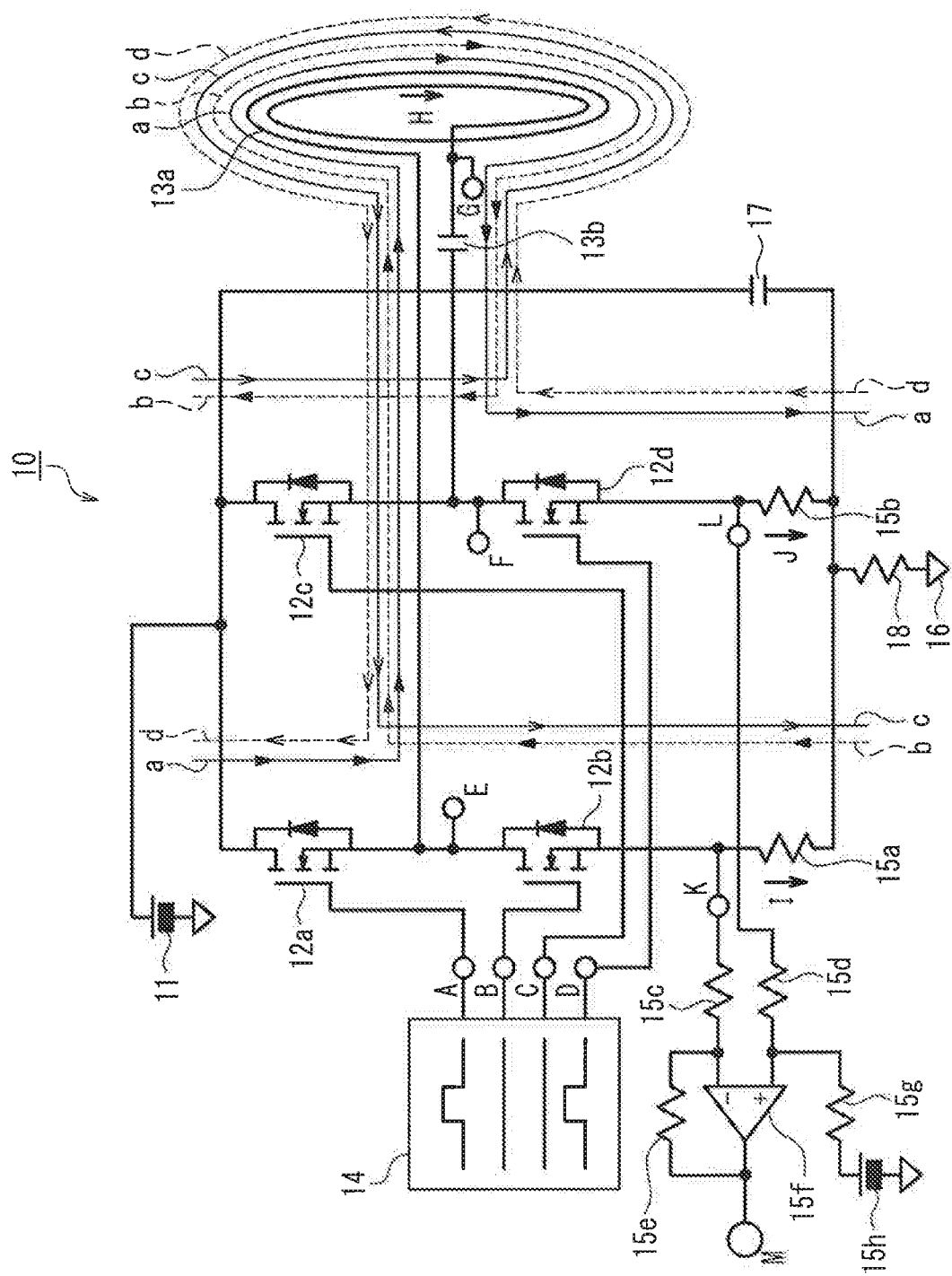
FIG. 4 is a diagram showing an operation of a wireless power transfer system of this embodiment that is used as a power transmission apparatus.

FIG. 4 is a circuit configuration diagram showing the configuration of the wireless power transfer system of this embodiment that is used as a power transmission apparatus.

The configuration of a power transmission apparatus 10 shown in FIG. 4 is the same as that shown in FIGS. 1 and 2. The power transmission apparatus 10 includes a power supply 11, a full-bridge circuit (inverter) 12 including four switching devices (12a, 12b, 12c, 12d), a resonant coil 13a and a resonant capacitor 13b that constitute a power transmission (primary) resonator 13, a drive control circuit 14 that controls the operation of each of the switching devices (12a, 12b, 12c, 12d) of the full-bridge circuit (inverter) 12, and a detector 15 that detects a resonance current flowing through the power transmission (primary) resonator 13 from the current flowing through the full-bridge circuit (inverter).

The four switching devices 12a, 12b, 12c, 12d are composed of MOSFETs and conduct a current when signals applied from four terminals A, B, C, D of the drive control circuit 14 are High. As shown in FIG. 4, the body diodes of the MOSFETs are arranged in the direction in which a current flows from the ground 16 to the power supply 11.

In the power transmission apparatus 10 of FIG. 4, the detector 15 includes an inversion synthesis circuit in addition to the two resistors 15a and 15b that are used to detect the currents flowing through the two switching devices 12b and 12d located on the ground 16 side of the full-bridge circuit (inverter) 12, respectively. The inversion synthesis circuit includes resistors 15c, 15d, 15e, 15g, an amplifier 15f, and a power supply 15h. With this configuration, the current flowing through the switching device 12b is inverted and combined with the current flowing through the switching device 12d, and thus the detected voltage of the resonance current is output to a terminal M.

In the power transmission apparatus 10 of FIG. 4, a capacitor 17 serving as a bypass capacitor is placed between the power supply 11 and the ground 16. The resonance current flowing through the power transmission (primary) resonator 13 usually flows via the capacitor 17 having a small AC resistance component. Moreover, a voltage detection resistor 18 is placed between the full-bridge circuit (inverter) 12 and the ground 16.

Due to the presence of the capacitor 17 and the resistor 18, the power output from the power supply 11 can be detected based on the current flowing through the power transmission apparatus 10 other than the resonance current. Therefore, the actually transmitted power can be detected and appropriately used to control the operation of the switching circuit by the drive control circuit.

The transmitted power can be detected in the same manner even when the resistor 18 is placed between the power supply 11 and the full-bridge circuit (inverter) 12. However, the resistor 18 placed in a high voltage system will require a high withstand voltage. Thus, it is more preferable that the resistor 18 is located on the ground side, as shown in FIG. 4. The bypass capacitor 17 and the resistor 18 are not essential for the power transmission apparatus 10 of this embodiment.

In FIG. 4, in addition to the terminals A to D and M, five terminals E, F, G, K, and L are provided for operations, which will be described below. The terminal E is located in the middle portion between the first switching device 12a and the second switching device 12b of the full-bridge circuit (inverter) 12. The terminal F is located in the middle portion between the third switching device 12c and the fourth switching device 12d of the full-bridge circuit (inverter) 12. The terminal G is located between the resonant coil 13a and the resonant capacitor 13b of the power transmission (primary) resonator 13. The terminal K indicates the voltage of the first resistor 15a of the current detector 15. The terminal L indicates the voltage of the second resistor 15b of the current detector 15.

In the following description, the direction from the power supply to the ground is defined as the positive direction of the resonance current H, I, J, as indicated by the arrows in FIG. 4.

In FIG. 4, reference numerals a to d for solid or dotted lines and arrows represent the current flowing through the full-bridge circuit (inverter) 12 during PWM control, which will be described with reference to FIG. 6. See the following description of FIG. 6 for more details.

a. Activation and Control of Resonance Current

Figure 5:
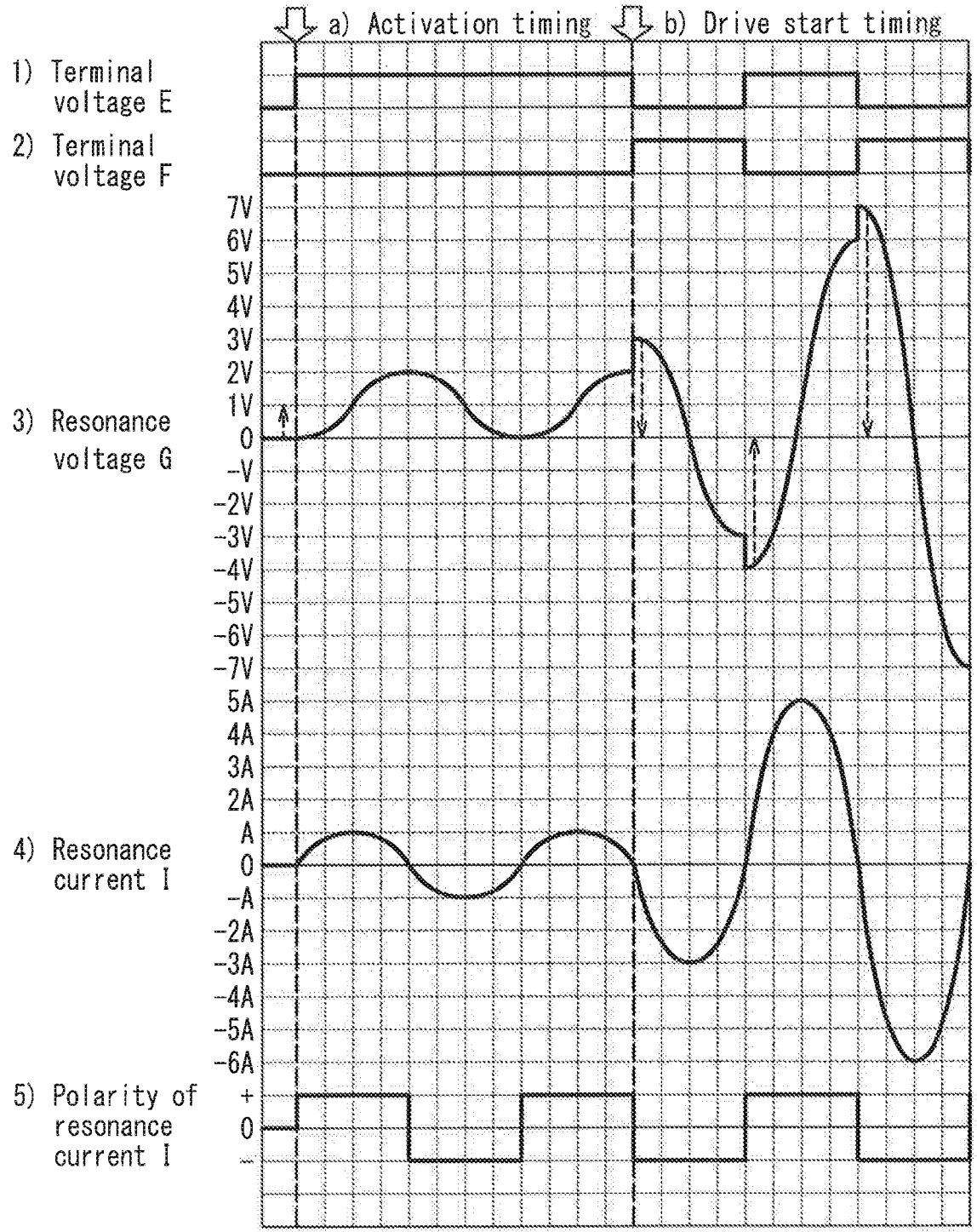
FIG. 5 is a timing chart showing a step response to activation and an operation for increasing resonance in a resonator when a wireless power transfer system of this embodiment is used as a power transmission apparatus.

FIG. 5 is a timing chart showing terminal voltage waveforms and resonant current waveforms in a power transmission operation of the power transmission apparatus of this embodiment.

In FIG. 5, the horizontal grid represents the timing of the operation by labelling. The vertical grid represents the level of the applied voltage such as High (appropriately referred to as "Hi" in the following) and Low (appropriately referred to as "Lo" in the following), and also represents the height direction of waveforms of the resonance current and the resonance voltage by labelling. Like FIG. 5, each of the timing charts used in the following description shows the timing of the operation and the waveforms of the applied voltage, the resonance voltage, and the resonance current.

In a) activation timing, the drive control circuit 14 turns ON the first switching device 12a and the fourth switching device 12d and turns OFF the second switching device 12b and the third switching device 12c of the full-bridge circuit (inverter) 12, so that the voltage of the terminal E is set to Hi and the voltage of the terminal F is set to Lo. Then, a resonance current flows to charge the power transmission (primary) resonator 13. When the resonant capacitor 13b is charged, the current flows in the opposite direction, and thus resonance occurs, as indicated by the resonance voltage G and the resonance current I.

In the power transmission apparatus of this embodiment, the voltage applied to the terminals E and F is further controlled in accordance with the above resonance timing.

Specifically, subsequent to the activation, the voltage applied from the drive control circuit 14 to the four switching devices 12a to 12d is controlled in accordance with the polarity of the resonance current I (where "+" means positive, indicating the direction of the arrow H in FIG. 4 and "−" means negative, indicating the opposite direction to the arrow H in FIG. 4) after b) drive start timing. When the polarity of the resonance current I is "positive", the drive control circuit 14 turns ON the first switching device 12a and the fourth switching device 12d and turns OFF the second switching device 12b and the third switching device 12c of the full-bridge circuit (inverter) 12, so that the voltage of the terminal E is set to Hi and the voltage of the terminal F is set to Lo. On the other hand, when the polarity of the resonance current I is "negative", the drive control circuit 14 turns ON the second switching device 12b and the third switching device 12c and turns OFF the first switching device 12a and the fourth switching device 12d of the full-bridge circuit (inverter) 12, so that the voltage of the terminal E is set to Lo and the voltage of the terminal F is set to Hi.

The four gates A to D of the drive control circuit 14 are controlled at the time the resonance current I is detected to be 0 in FIG. 5, and the operation is started in which the voltage of the terminal F is set to Hi and the voltage of the terminal E is set to Lo as the resonance current I changes from a positive value to a negative value, and the voltage of the terminal E is set to Hi and the voltage of the terminal F is set to Lo as the resonance current I changes from a negative value to a positive value.

In this manner, e.g., the voltage of the terminal F is set to the power supply voltage and the voltage of the terminal E is set to the ground potential at the point indicated by b) drive start timing in FIG. 5. Thus, the voltage of the terminal F is increased by the amount corresponding to the power supply voltage, and accordingly the potential of the other terminal G of the resonant capacitor 13b is increased from 2 V to 3 V. At this time, since one end of the resonant coil 13a on the terminal E side is fixed to the ground potential, a potential difference of 3 V is applied between both ends of the resonant coil 13a, as indicated by the dashed arrow in FIG. 5. According to this potential difference, a current starts to flow through the resonant coil 13a, as indicated by the resonance current I. This current continues to increase until the voltage between both ends of the resonant capacitor 13b becomes 0, and when the voltage is 0, the current flowing through the resonant coil 13a reaches a maximum value. Then, the resonant capacitor 13b in turn is charged with the energy of the magnetic field stored in the resonant coil 13a. Consequently, the potential of the resonant capacitor 13b continues to decrease until the resonance current I becomes 0, and the potential of the terminal G is reduced to −3 V.

At this time, when the gate signal from the drive control circuit 14 is controlled so that the terminal E is set to the power supply voltage and the terminal F is set to the ground potential, the voltage of the terminal F is reduced by 1 V, which corresponds to the power supply voltage, and such a change in voltage appears in the terminal G through the resonant capacitor 13b. Accordingly, a potential difference of 4 V is applied to the resonant coil 13a, as indicated by the length of the dashed arrow in FIG. 5. Thus, the resonance current starts to flow and the resonance voltage itself increases, as described above.

As this operation continues, the current flows from the full-bridge circuit (inverter) 12 in the direction in which it compensates for the resonance current I flowing through the power transmission (primary) resonator 13. Therefore, the resonance in the power transmission (primary) resonator 13 is increasing and stably continues because the power consumed by, e.g., the resistors of the coil will finally become equal to the injected power. The resonance in the power transmission (primary) resonator 13 may be gradually attenuated by the resistance component of the resonant circuit when only the voltage of the terminal E is set to Hi, as in the activation operation with a) activation timing. However, since the drive control circuit 14 controls the ON/OFF of each of the switching devices 12a to 12d of the full-bridge circuit (inverter) 12, the increased resonance in the power transmission (primary) resonator 13 can be maintained.

In the wireless power transfer system of this embodiment, the above operation is started to maintain the peak point of the overall resonance characteristics of the power transmission (primary) resonator and the power reception (secondary) resonator, and subsequently the oscillation continues. Therefore, the wireless power transfer system is used as a power transmission apparatus that performs so-called self-oscillation.

More specifically, in the power transmission apparatus 10 of this embodiment, a current is applied from the full-bridge circuit (inverter) 12 to the power transmission (primary) resonator 13 in order to maintain the resonance in the power transmission (primary) resonator 13. In this case, the current is applied in synchronization with the resonance current I flowing through the power transmission (primary) resonator 13. When the power transmission apparatus 10 and the power reception apparatus 20 are arranged so that power can be transmitted between them, the resonance current I flows through the power transmission (primary) resonator 13 based on the resonance characteristics in the state where the power transmission (primary) resonator 13 is coupled to the power reception (secondary) resonator 23 of the adjacent power reception apparatus 20. The power transmission apparatus 10 measures a resonance current excited by the voltage that is applied at the activation timing, and allows the drive control circuit 14 to control the full-bridge circuit (inverter) 13 according to a change in the polarity of the resonance current, thereby applying the current to the resonant circuit. Thus, the current applied to the resonant circuit depends on the resonance characteristics in the coupled state with the power reception (secondary) resonator 23 of the power reception apparatus 20. Therefore, regardless of the distance between the power transmission apparatus 10 and the power reception apparatus 20 or the presence or absence of foreign matter between the power transmission apparatus 10 and the power reception apparatus 20, the power transmission apparatus 10 of this embodiment can perform self-oscillation to resonate the power transmission (primary) resonator 13 in the optimum state.

In the power transmission apparatus 10 of this embodiment, the resonance current flowing through the power transmission (primary) resonator 13 is detected by the detector 15 from the current flowing through the full-bridge circuit (inverter) 12, and the switching devices of the full-bridge circuit (inverter) 12 are controlled in accordance with the polarity of the resonance current. Therefore, e.g., even if the distance between the power transmission apparatus 10 and the power reception apparatus 20 is changed, or if foreign matter enters between the power transmission (primary) resonator 13 and the power reception (secondary) resonator 23, the timing of the current application to the power transmission (primary) resonator 13 can be changed in accordance with the coupled state of the power transmission (primary) resonator 13 and the power reception (secondary) resonator 23 at that time. Consequently, it is not necessary to set the characteristics of the resonant coil 13a and the resonant capacitor 13b of the power transmission (primary) resonator 13 in advance by measuring the resonance characteristics from the conditions of the power transmission (primary) resonator 13 and the power reception (secondary) resonator 23. Moreover, it is not necessary to change the circuit characteristics of the power transmission coil 13a and the power transmission capacitor 13b in order to change the circuit characteristics of the resonators in accordance with the coupled state of the power transmission (primary) resonator 13 and the power reception (secondary) resonator 23. This can simplify the circuit configuration of the power transmission (primary) resonator 13, and thus can reduce the size and cost of the power transmission apparatus 10.

For example, when the load of the power reception apparatus 20 is reduced while the power transmission (primary) resonator 13 is magnetically coupled to the power reception (secondary) resonator 23, the resonance voltage in the power reception apparatus increases, which in turn increases the resonance voltage of the power transmission (primary) resonator 13. Thus, if the resonance voltage remains high, it further increases and can exceed the withstand voltage of the components constituting the resonators.

To deal with this issue, the power transmission apparatus 10 may include a resonance voltage detector (not shown) that detects a resonance voltage appearing in the terminal G of the power transmission (primary) resonator 13. If the detected voltage is excessively high, the supply of power from the full-bridge circuit (inverter) 12 to the power transmission (primary) resonator 13 will be stopped, or a current will be allowed to flow in the opposite direction to the resonance current I, so that the resonance voltage can be reduced.

For example, when the polarity of the resonance current I is negative, i.e., the resonance current I flows from the terminal F to the terminal E, the full-bridge circuit (inverter) 12 is controlled in such a way that the switching devices 12b and 12c are turned ON and the switching devices 12a and 12d are turned OFF, so that the voltage of the terminal E is set to the ground potential (referred to as "negative" for convenience) and the voltage of the terminal F is set to the power supply voltage (referred to as "positive" for convenience). When the polarity of the resonance current I is positive, i.e., the resonance current I flows from the terminal E to the terminal F, the full-bridge circuit (inverter) 12 is controlled in such a way that the switching devices 12a and 12d are turned ON and the switching devices 12b and 12c are turned OFF, so that the voltage of the terminal E is set to positive and the voltage of the terminal F is set to negative.

As a result of the above operation of the drive control circuit, a current is applied to the power transmission (primary) resonator 13 in the opposite direction to the resonance direction, and thus acts to reduce the resonance voltage and the resonance current.

In the power transmission apparatus 10 of this embodiment, the drive control circuit 14 controls the ON/OFF of each of the switching devices (12a to 12d) of the full-bridge circuit (inverter) 12 based on the resonance current flowing through the full-bridge circuit (inverter) 12 that is detected by the detector 15. This configuration can effectively avoid a situation where the circuits of the resonator may be damaged because the resonance voltage becomes excessively high and exceeds the withstand voltage of the circuits of the resonator.

To address the increased resonance voltage and resonance current, the drive control circuit 14 is operated to reduce the resonance voltage in the power transmission apparatus 10.

In this case, when the value of the resonance voltage is reduced due to an increase in the load of the power reception apparatus 20, it can be detected by the detector 15, and the operation is performed to increase the current flowing from the full-bridge circuit (inverter) 12 to the power transmission (primary) resonator 13, as in the operation for self-oscillation. Thus, the magnitude of the resonance voltage applied to the power transmission (primary) resonator 13 can be maintained at a predetermined value.

b. PWM Control

Next, operations for power control and power saving in a power transmission circuit of this embodiment will be described.

Figure 6:
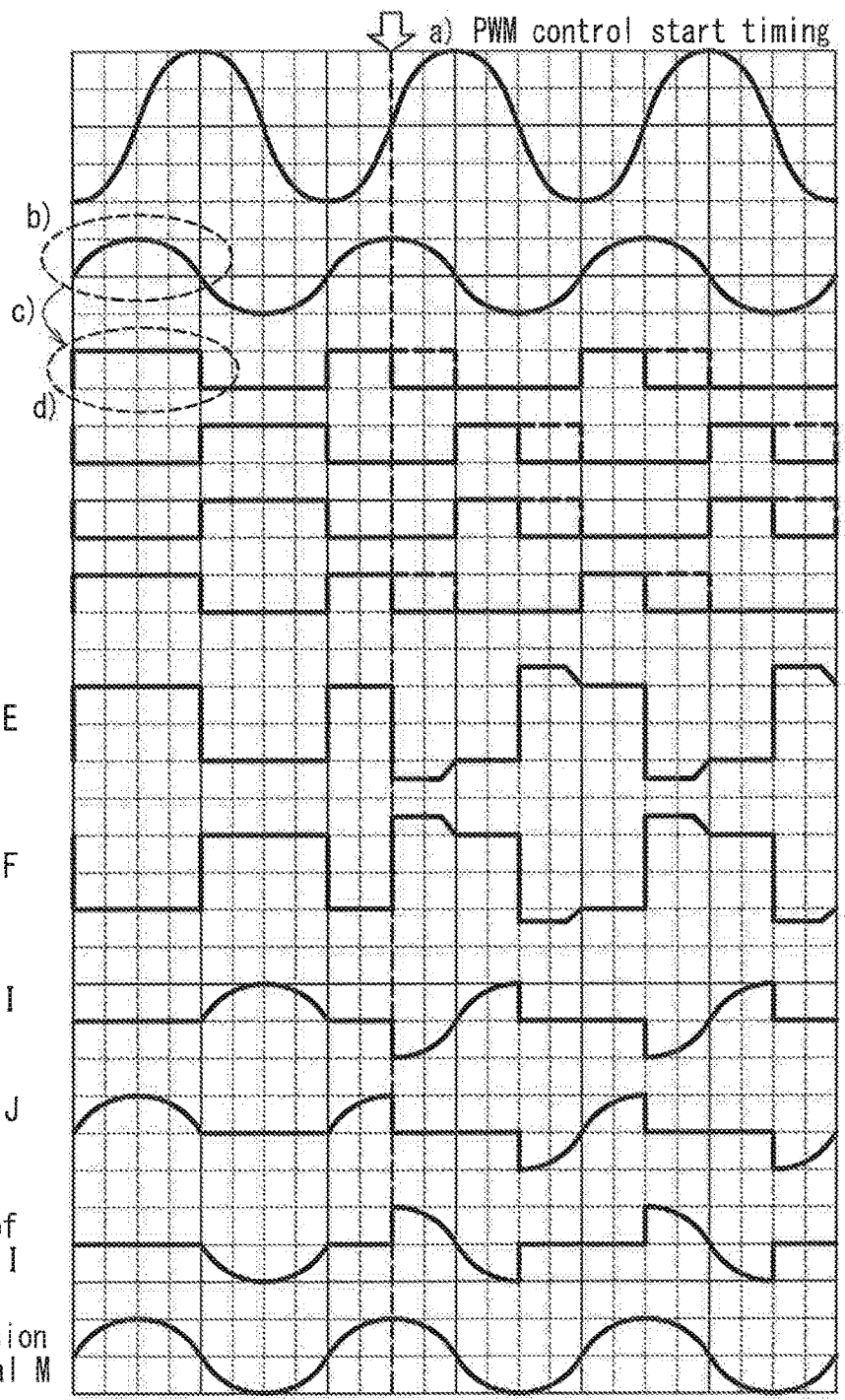
FIG. 6 is a timing chart showing a PWM control operation when a wireless power transfer system of this embodiment is used as a power transmission apparatus.

FIG. 6 is a diagram showing PWM control for controlling the width of a voltage to be applied to each switching device of the full-bridge circuit (inverter) in the power transmission apparatus of this embodiment.

FIG. 6 shows the following: the Hi and Lo states of voltages of four terminals A, B, C, and D of the drive control circuit 14; the current I flowing through the first resistor 15a of the detector 15; the current J flowing through the second resistor 15b of the detector 15; the inverted signal of the detected current I that is produced by the inversion synthesis circuit of the detector 15; and the voltage waveform in the inversion synthesis terminal M obtained by combining the inversion signal with the detected current J.

In the left part of FIG. 6, the above self-oscillation operation is performed in which the full-bridge circuit (inverter) is operated to maintain the resonance current in the power transmission (primary) resonator 13.

When the power transmission (primary) resonator 13 is operating stably by the self-oscillation operation, the PWM control is performed to change the application time of the voltage that is applied from the drive control circuit 14 to each of the four switching devices 12a to 12d of the full-bridge circuit (inverter) 12.

To explain the flow of the resonance current during the PWM control, the current directions are represented by reference numerals a to d in FIG. 4. As shown in FIG. 4, the filled arrow indicates the current direction when the resonance current flows in the same direction as the arrow H, and the unfilled arrow indicates the current direction when the resonance current flows in the opposite direction to the arrow H. Moreover, the solid line represents the flow path of the current in the ON state of the switching devices, and the dashed line represents the flow path of the current in the OFF state of the switching devices. Thus, the direction of the resonance current and the states of the switching devices can be shown simultaneously.

The reference numeral b represents the resonance current flowing in the positive direction through the power transmission (primary) resonator 13 when the switching devices are in the OFF state. This current flows through the body diodes of the switching devices 12c and 12b. The reference numeral c represents the resonance current flowing in the opposite direction through the power transmission (primary) resonator 13 when the first switching device 12a and the fourth switching device 12d are turned OFF and the second switching device 12b and the third switching device 12c are turned ON.

FIG. 6 shows an example of the PWM control in which the pulse width of the Hi voltage applied to the gate of each switching device is reduced by one-half. In order to make it clear that the PWM control can reduce the voltage applied to each of the terminals of the gates A to D, the dotted line in FIG. 6 represents a voltage application period in which the PWM control is not performed.

In FIG. 6, after the timing shown as a) PWM control, the voltage applied to the switching device a and the switching device d is changed from Hi to Lo by the PWM control. Accordingly, the voltage of the terminal E is changed from the Hi to Lo state and the voltage of the terminal F is changed from the Lo to Hi state. At this time, the voltage of the terminal E is lower than the Lo voltage and the voltage of the terminal F is higher than the Hi voltage. This is because the voltage between both ends of a parasitic diode of the MOSFET used as the switching device is superimposed on the terminal voltage.

The behavior of the voltages of the terminals E and F by the PWM control of the operating voltage applied to each switching device occurs in the same way, but in the opposite direction, when the switching devices 12b and 12c are in the ON state and the resonance current has the opposite polarity.

As described above, when the PWM control is performed on the driving voltage applied to each switching device of the full-bridge circuit (inverter), the resonance current I and the resonance current J vary significantly with a change in voltage between Hi and Lo by the operation of the switching devices during the PWM control. In the full-bridge circuit (inverter) 12 including the four switching devices, as shown in FIG. 4, the resonance current I flows through the lower switching device of a first series of the switching devices located on the left side of FIG. 4, and the resonance current J flows through the lower switching device of a second series of the switching devices located on the right side of FIG. 4. However, in the power transmission apparatus of this embodiment, the resonance current I and the resonance current J are inverted and combined to provide the voltage of the terminal M in the detector. Therefore, similarly to the operation without the PWM control, the resonance current can be detected, as shown in FIG. 6.

Thus, it is possible to detect the resonance current while the magnetic coupling is always established and power is transmitted between the power transmission apparatus and the power reception apparatus. Consequently, the self-oscillation control and the control for reducing the resonance voltage can be performed.

The PWM control can reduce the transmitted power in the power transmission apparatus, resulting in wireless power transmission with low power consumption. Moreover, the PWM control can adjust the magnitude of the resonance voltage by changing the logic of the drive control circuit. This can eliminate the need for PAM (pulse amplitude modulation) control in which the voltage applied to the full-bridge circuit (inverter) is changed by a DC/DC converter that has been used in the conventional wireless power transfer system. Thus, the size and cost of the power transmission apparatus can be reduced.

c. Power Transmission Suspend and Recovery Operation

Figure 7:
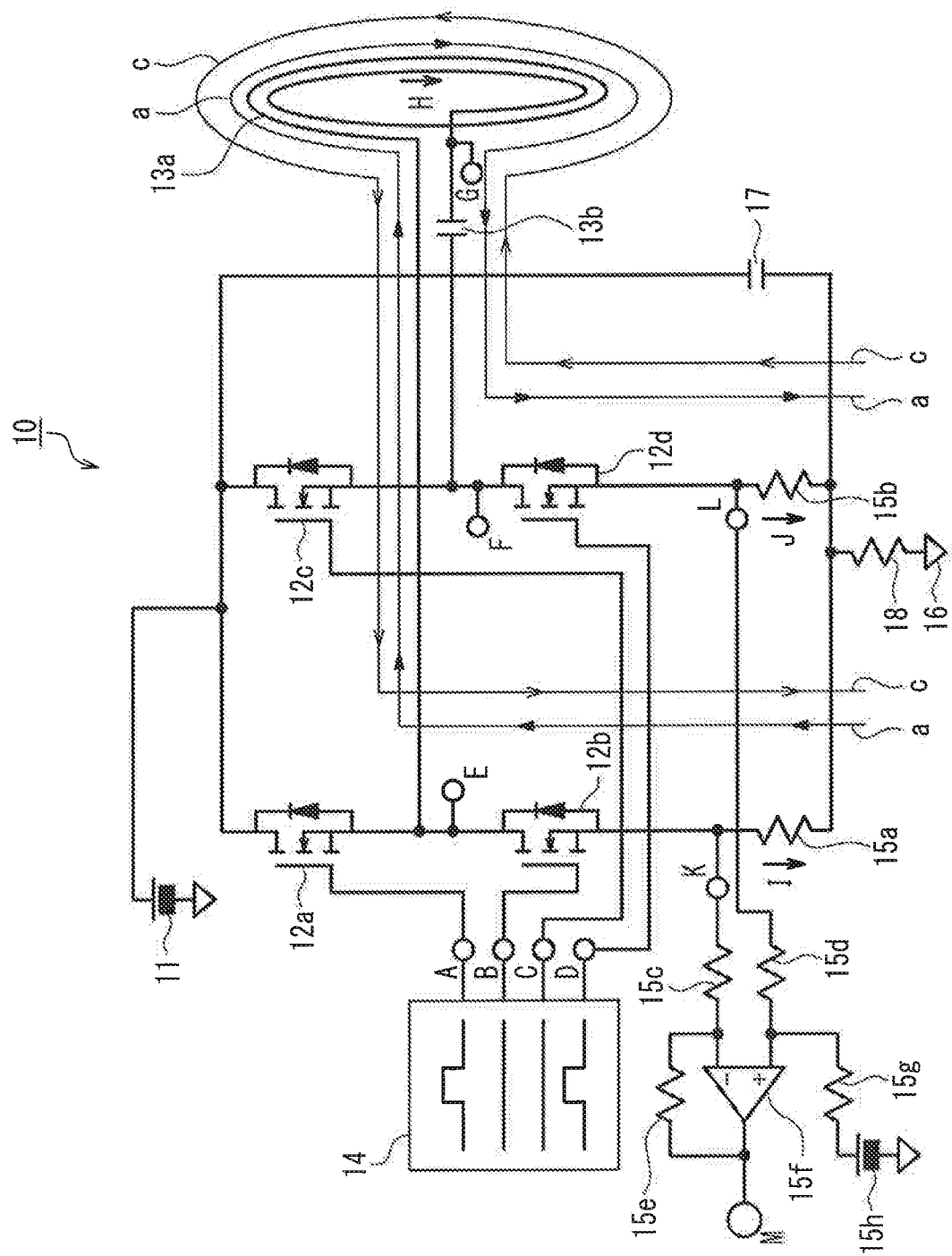
FIG. 7 is a diagram showing an operation in a power transmission suspend mode when a wireless power transfer system of this embodiment is used as a power transmission apparatus.

FIG. 7 is a circuit configuration diagram of the power transmission apparatus of this embodiment for explaining the flow of a current in an operation to suspend the transmission of power in the power transmission apparatus.

Figure 8:
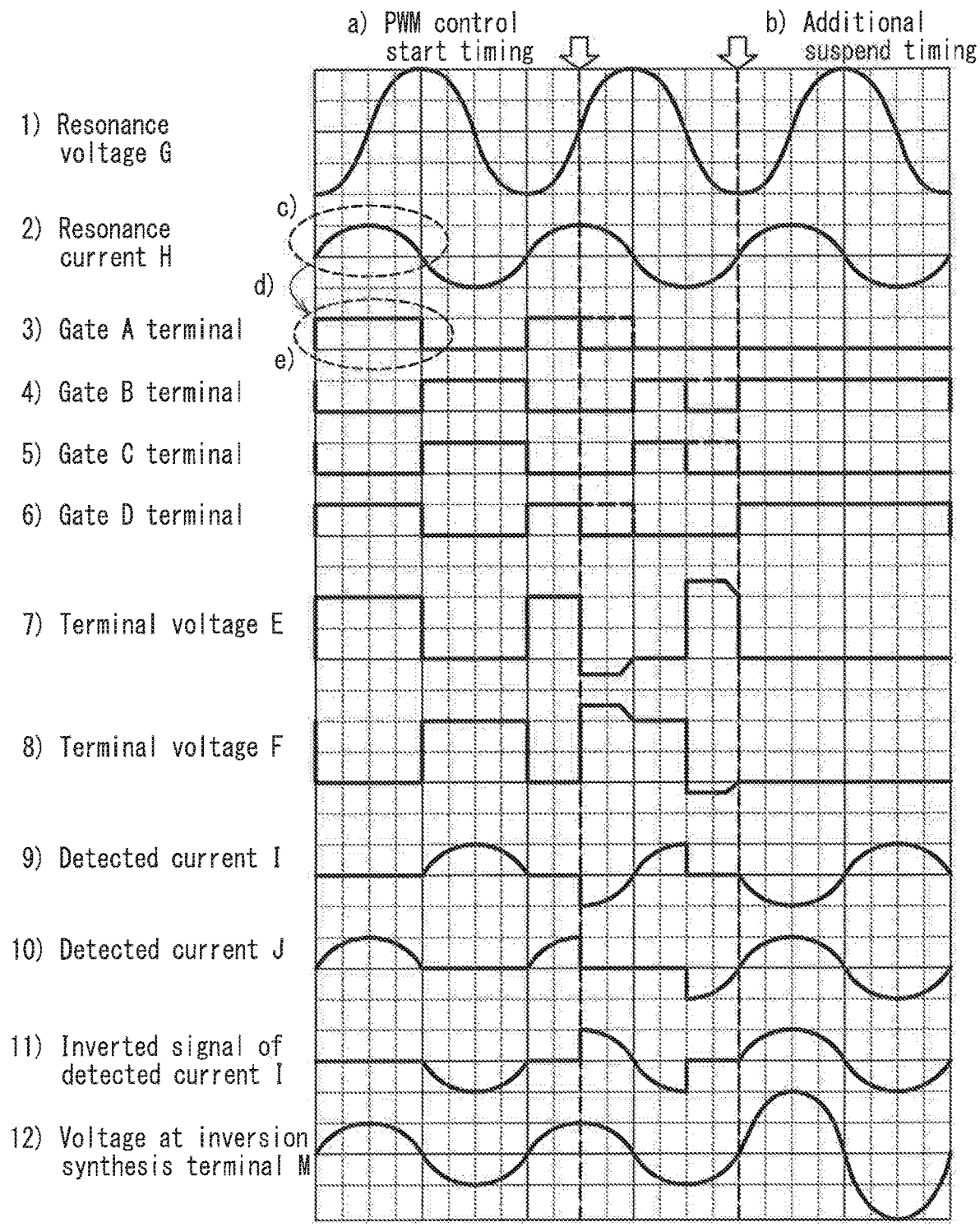
FIG. 8 is a timing chart showing an operation in a power transmission suspend mode when a wireless power transfer system of this embodiment is used as a power transmission apparatus.

FIG. 8 is a timing chart showing an operation to suspend the transmission of power in accordance with the polarity of the resonance current in the power transmission apparatus.

When power is transmitted from the power transmission apparatus to the power reception apparatus by the self-oscillation operation and the PWM control operation, as described above, the transmission of power can be temporarily suspended by the following operation. As indicated by b) additional suspend timing in FIG. 8, the gate terminals B and D are set to Hi and the gate terminals A and C are set to Lo in the drive control circuit 14, and then the full-bridge circuit (inverter) 12 is controlled in such a way that the switching devices 12b and 12d located on the ground 16 side are turned ON and the switching devices 12a and 12c located on the power supply 11 side are turned OFF.

In this manner, the resonance current H flows only between the devices located on the ground side of the full-bridge circuit (inverter) 12 and the power transmission (primary) resonator, as indicated by the arrows a and c in FIG. 7. In the power transmission apparatus of this embodiment, the detector 15 detects the current I and the current J flowing through the two devices located on the ground side of the full-bridge circuit (inverter) 12, respectively. Therefore, the resonance current indicated by the arrows a and c in FIG. 7 can be detected as the resonance current I and the resonance current J shown in FIG. 8.

In the power transmission apparatus 10 of this embodiment, the current I flowing through the first resistor 15a is inverted and combined with the current J flowing through the second resistor 15b. Therefore, as shown in FIG. 8, the phase, i.e., the timing at which the resonance current becomes 0 is the same, but the voltage value in the terminal M is two times as high as the voltage value during the self-oscillation control or PWM control. Thus, when the transmission of power is resumed from the suspended state, the ON/OFF control of each switching device of the full-bridge circuit (inverter) 12 can be immediately restarted with the same timing as the operation timing before the suspend according to the timing of the resonance current detected by the detector 15.

In the power transmission apparatus of this embodiment, the detector detects the current flowing through the switching devices located on the ground side of the full-bridge circuit (inverter) in order to suppress the withstand voltage of the detector or the like. As described above, the detector may also detect the current flowing through the switching devices located on the power supply side of the full-bridge circuit (inverter). In this case, when the detector is configured to detect the current flowing through the switching devices (A, C) located on the power supply side of the full-bridge circuit (inverter), the transmission of power can be suspended by the following operation. The terminals A and C are set to Hi and the terminals B and D are set to Lo in the drive control circuit, so that the resonance current H of the power transmission (primary) resonator is controlled to flow through the power supply side of the full-bridge circuit (inverter) 12. Thus, the resonant current waveform can be continuously detected during the suspend, and the power transmission apparatus can be immediately restored to the power transmission state from the suspended state.

Figure 9:
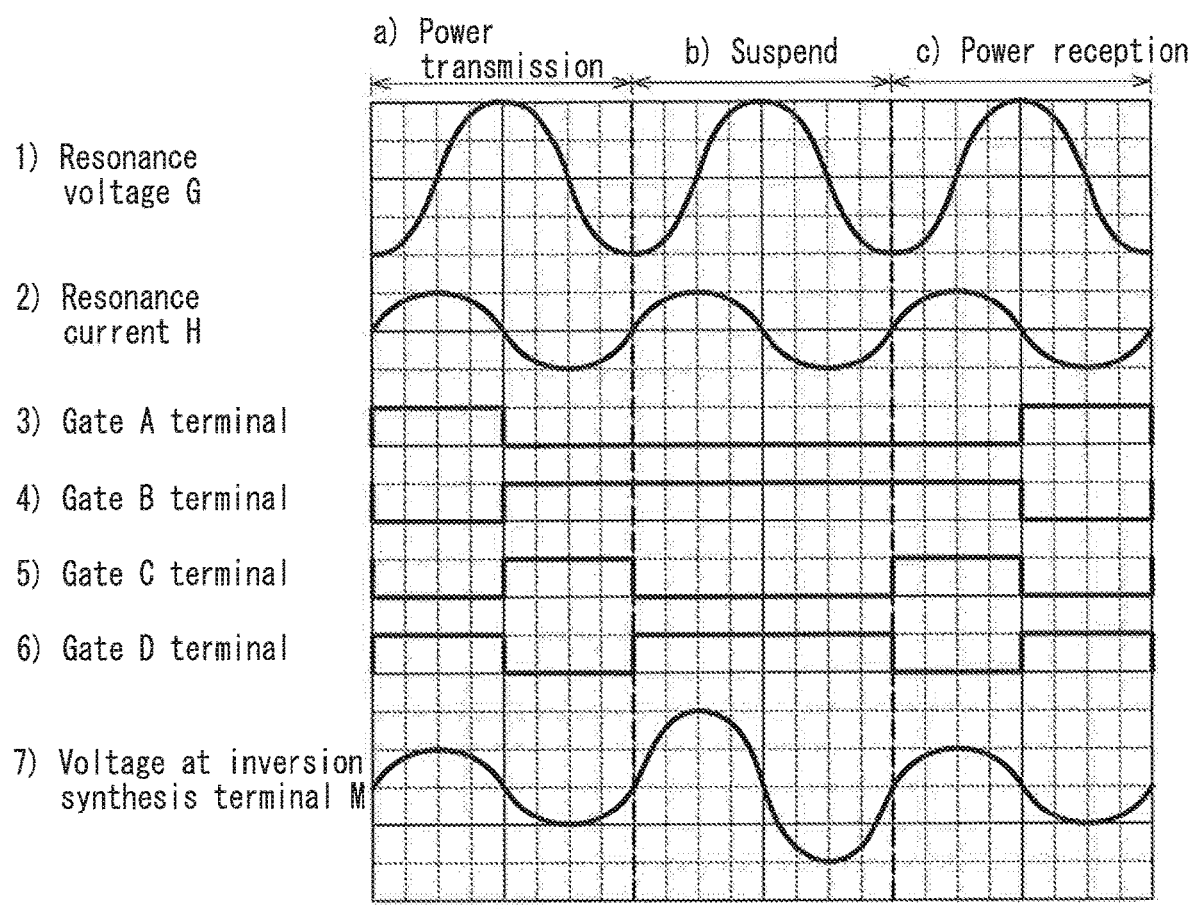
FIG. 9 is a timing chart showing operations in a power transmission mode, a suspend mode, and a power reception mode when a wireless power transfer system of this embodiment is used as a power transmission apparatus.

FIG. 9 is a timing chart showing an operation in a power reception mode to recover the power remaining in the power transmission (primary) resonator after the power transmission apparatus of this embodiment is brought into the suspended state.

As described above, a secondary battery may be used as the power supply 11 of the power transmission apparatus 10 of this embodiment. In this case, if it is possible to recover the power that remains in the power transmission (primary) resonator 13 after the transmission of power from the power transmission apparatus 10 has been stopped, the power of the secondary battery as the power supply 11 can be recovered accordingly.

As shown in FIG. 9, in the suspended state, the voltages of the terminals B and D are set to Hi and the voltages of the terminals A and C are set to Lo, so that only the two switching devices 12b and 12d located on the ground side of the full-bridge circuit (inverter) 12 are turned ON. Thereafter, the voltages of the terminals B and C are set to Hi and the voltages of the terminals A and D are set to Lo when the resonance current is "positive", and the voltages of the terminals A and D are set to Hi and the voltages of the terminals B and C are set to Lo when the resonance current is "negative". In this manner, a current flows through the full-bridge circuit (inverter) 12 in a phase opposite to that of the power transmission state, thus performing the operation in the power reception mode.

In the power transmission apparatus of this embodiment, the currents flowing through the two switching devices located on the ground side of the full-bridge circuit (inverter), respectively, are inverted and combined to provide the output of the detector. Therefore, as shown in FIG. 9, the detected resonance voltage waveform in the power reception mode is the same as that in the power transmission mode or the suspend mode. Thus, the power transmission apparatus can smoothly switch between the power transmission mode, the suspend mode, and the power reception mode.

In the above power reception mode, the control state, in which the operating pulse is applied from the drive control circuit 14 to each switching device of the full-bridge circuit (inverter) 12 in accordance with the phase of the resonance current, is reversed from that in the power transmission mode. This control state in the power reception mode is the same as that in the power reception operation of the full-bridge circuit (inverter) 22 of the power reception apparatus 20, as will be described later.

In the power transmission apparatus of this embodiment, the currents flowing through the two switching devices located on the ground side of the full-bridge circuit (inverter) are detected, and the ON/OFF timing of each switching device of the full-bridge circuit (inverter) is switched in accordance with the phase of the detected current. Thus, the ON/OFF of each switching device of the full-bridge circuit (inverter) of the power transmission apparatus can be controlled based on the resonance waveform in the state where the power transmission apparatus is magnetically coupled to the power reception apparatus. Therefore, the power transmission apparatus can automatically follow the variation in resonant current waveform due to, e.g., a change in the distance between the power transmission coil and the power reception coil or the presence or absence of foreign matter between these coils, and can transmit power with low power transmission losses.

Moreover, since the magnitude of the resonance voltage of the power transmission (primary) resonator that is magnetically coupled to the power reception (secondary) resonator can be detected, the resonance power can be reduced before the resonance voltage becomes excessively high. For example, even if the load of the power reception apparatus is reduced, it is possible to effectively prevent the circuit of the power transmission (primary) resonator from being damaged by an excessive voltage that exceeds the withstand voltage.

Further, the detector detects each of the currents flowing through the switching devices located on the ground side of the full-bridge circuit (inverter). Thus, the power transmission apparatus can be configured, at a low cost, to perform the PWM control or the control in the suspend mode, which serve to reduce the transmitted power, and the control in the power reception mode based on the resonance voltage waveform of the same continuous phase.

[Operation of Power Reception Apparatus]

Next, the operation of the wireless power transfer system of this embodiment that is used as a power reception apparatus will be described in detail.

Figure 10:
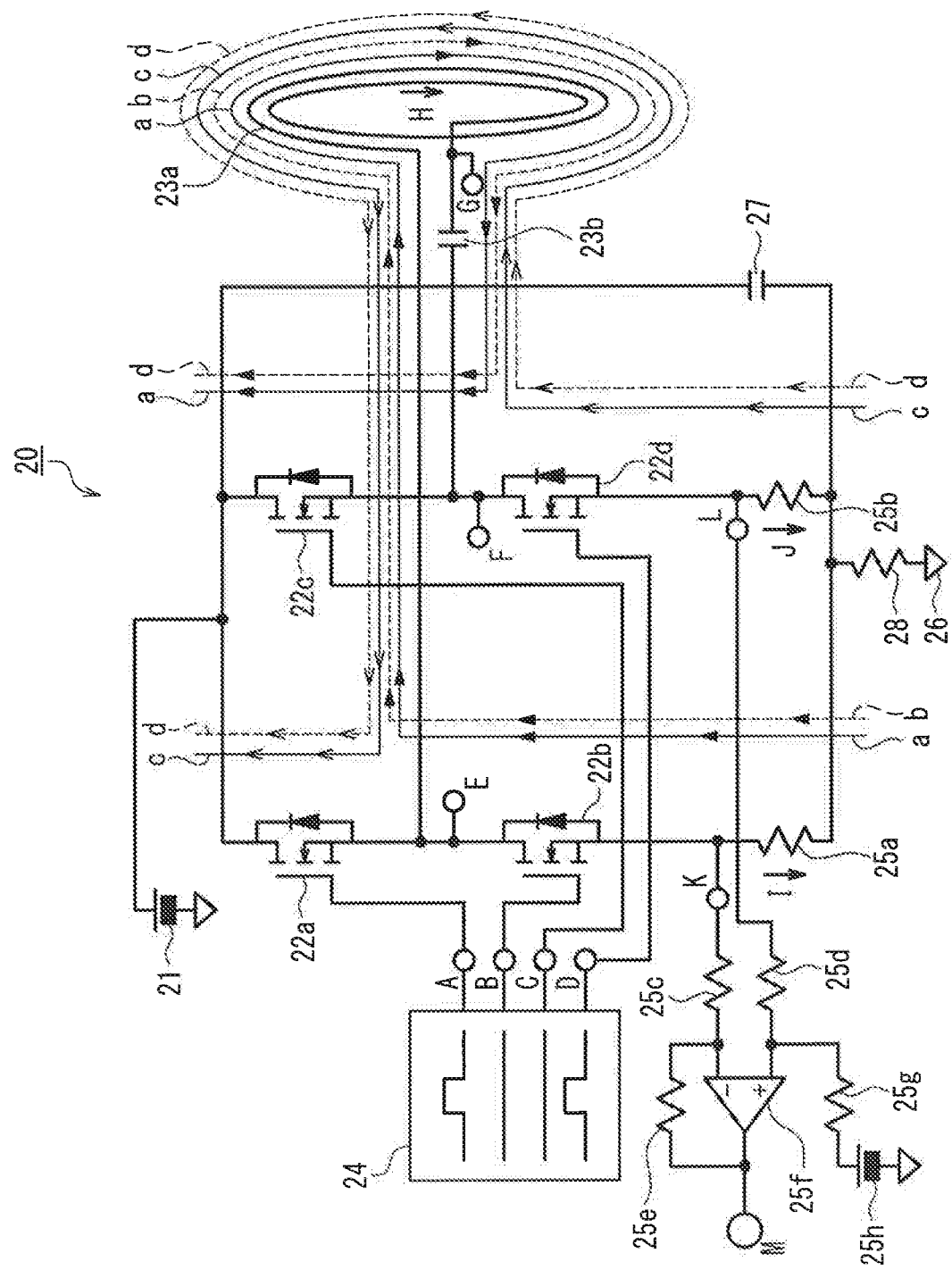
FIG. 10 is a diagram showing an operation of a wireless power transfer system of this embodiment that is used as a power reception apparatus.

FIG. 10 is a circuit configuration diagram showing the configuration of the wireless power transfer system of this embodiment that is used as a power reception apparatus.

As shown in FIGS. 1 and 2, the wireless power transfer system of this embodiment can be used as both the power transmission apparatus and the power reception apparatus with the same configuration. The names and reference numerals of the components of the power reception apparatus in FIG. 2 are also used in FIG. 10. Actually, the circuit components of a power reception apparatus 20 are the same as those of the power transmission apparatus in FIG. 4, except for the logic portion of the drive control circuit. In other words, the drive control circuit includes a logic portion for the power transmission apparatus and a logic portion for the power reception apparatus, and switches between them appropriately. This allows one wireless power transfer system to be used as both the power transmission apparatus and the power reception apparatus.

The configuration of the power reception apparatus 20 shown in FIG. 10 is the same as that shown in FIGS. 1 and 2. The power reception apparatus 20 includes a power supply 21, a full-bridge circuit (inverter) 22 including four switching devices (22a, 22b, 22c, 22d), a resonant coil 23a and a resonant capacitor 23b that constitute a power reception (secondary) resonator 23, a drive control circuit 24 that controls the operation of each of the switching devices (22a, 22b, 22c, 22d) of the full-bridge circuit (inverter) 22, and a detector 25 that detects a resonance current flowing through the power reception (secondary) resonator 23 from the current flowing through the full-bridge circuit (inverter).

The power reception apparatus 20 is also the same as the power transmission apparatus shown in FIG. 4 in the following features: the four switching devices 22a to 22d are composed of MOSFETs and conduct a current when signals applied from four terminals A to D of the drive control circuit 24 are High; and the body diodes of the MOSFETs are arranged in the direction in which a current flows from a ground 26 to the power supply 21, as shown in FIG. 10. Moreover, the detector 25 has the same configuration as the detector 15 of the power transmission apparatus 10. The detector 25 includes two resistors 25a and 25b that are used to detect the currents flowing through the two switching devices 22b and 22d located on the ground 26 side of the full-bridge circuit (inverter) 22, respectively, and an inversion synthesis circuit. The resonance voltage is output to the terminal M from the resonant current waveform obtained by inversion synthesis.

As shown in FIG. 10, in the power reception apparatus 20, a capacitor 27 serving as a bypass capacitor is placed between the power supply 21 and the ground 26. The resonance current flowing through the power reception (secondary) resonator 23 usually flows via the capacitor 27 having a small AC resistance component. Like the power transmission apparatus 10, a voltage detection resistor 28 is placed between the full-bridge circuit (inverter) 22 and the ground 26. With this configuration, the power output from the power supply 21 can be detected based on the current flowing through the power reception apparatus 20 other than the resonance current. For example, the power charged in a secondary battery that is used as the power supply 21, or the power consumed by a load circuit can be detected. The resistor 28 may be placed between the power supply 21 and the full-bridge circuit (inverter) 22, and the bypass capacitor 27 and the resistor 28 are not essential for the power reception apparatus 20 of this embodiment.

In addition to the terminals A to D and M, five terminals E, F, G, K, and L are provided in the same manner as the power transmission device for operations, which will be described below. In the following description, the direction of the arrow H in which the resonance current flows through the resonant coil 23a, and the direction in which the current I and the current J flow from the power supply to the ground are defined as the positive direction of the resonance current H, I, J.

In FIG. 10, reference numerals a to d represent the flow of the current when the current received by the power reception (secondary) resonator 23 is rectified by the full-bridge circuit (inverter) 22 that functions as a rectifier. The current represented by a to d in the power reception apparatus in FIG. 10 corresponds to the current directions represented by a to d and the states of the switching devices in the power transmission apparatus in FIG. 4. Specifically, the filled arrow indicates the current direction when the current flows through the resonant coil 23a in the same direction as the arrow H, and the unfilled arrow indicates the current direction when the current flows in the opposite direction to the arrow H. Moreover, the dashed line represents the flow path of the current when all the switching devices are turned OFF, and the solid line represents the flow path of the current when the switching devices are driven.

The flow path of the current a in the power reception apparatus 20 is different from that in the power transmission apparatus 10, since the body diodes of the switching devices 22a to 22d are used for detection in the power reception apparatus 20.

a. Synchronous Rectification Control Operation

Figure 11:
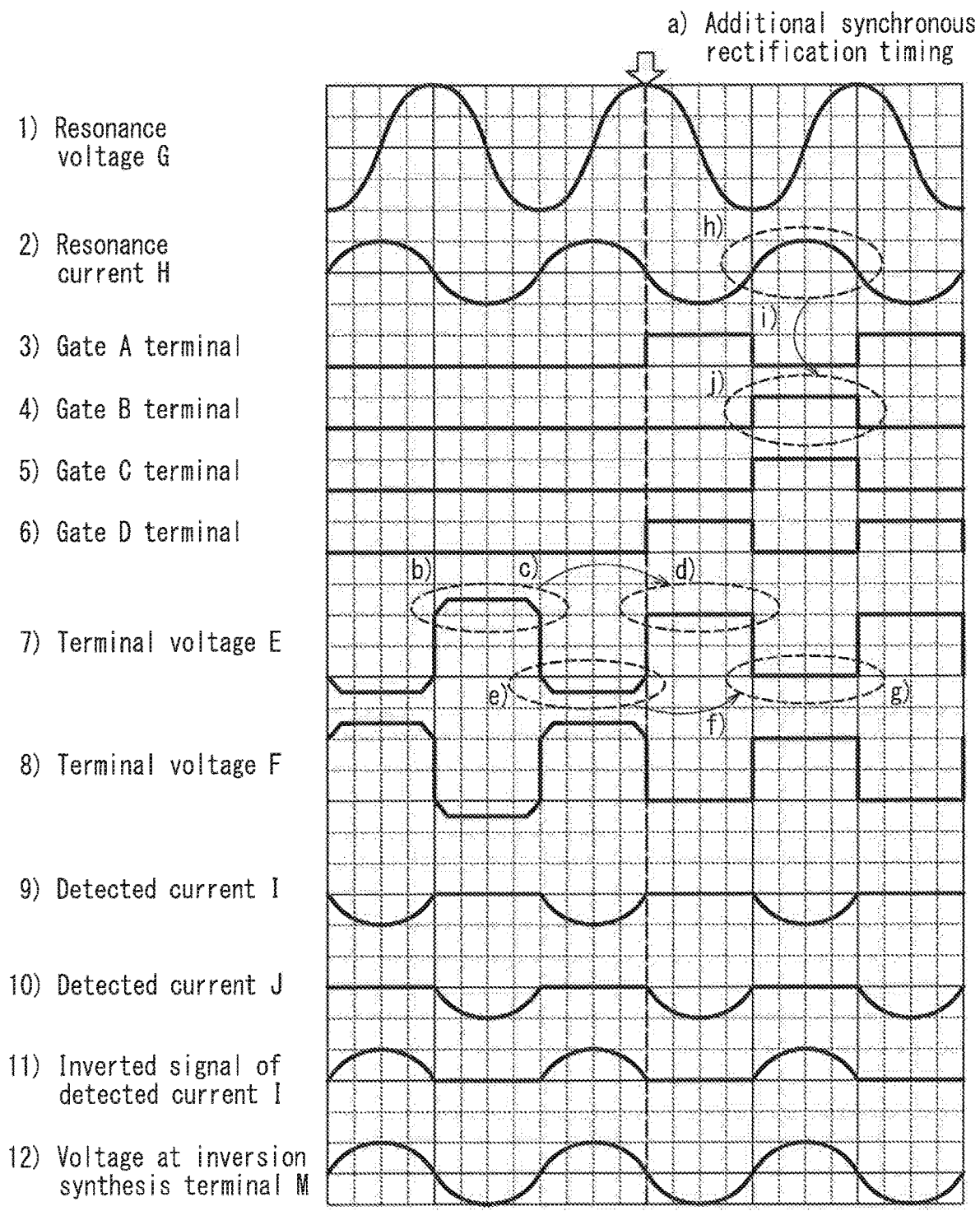
FIG. 11 is a timing chart showing a synchronous rectification operation when a wireless power transfer system of this embodiment is used as a power reception apparatus.

FIG. 11 is a diagram showing terminal voltage waveforms and resonant current waveforms in a power transmission operation of the power reception apparatus of this embodiment.

As shown in FIG. 11, in the power reception apparatus 20, when power starts to be transmitted from the power transmission apparatus 10, the operating voltages of all the four switching devices of the full-bridge circuit (inverter) 22 are set to Lo.

At this time, a voltage that varies between Hi and Lo in accordance with the phases of the resonance voltage waveform and the resonant current waveform is applied to the terminals E and F. Then, voltage drops at the body diodes of the switching devices 22a to 22d are superimposed on the resonance voltage waveform, as represented by, e.g., b) and e) in the voltage of the terminal E.

On the other hand, as indicated by a) additional synchronous rectification timing in FIG. 11, when the resonant current waveform is "negative", the terminals A and D are set to Hi and the terminals B and C are set to Lo in the drive control circuit 24, so that a current flows through the switching devices themselves without passing through their body diodes. Because of this current flow, bulges on the waveforms that have been caused by the voltage drops at the body diodes are removed from the voltage waveforms detected in the terminals E and F (see c) and f) in FIG. 11). Consequently, clean rectangular rectified waveforms can be obtained, as represented by d) and g) in FIG. 11.

As described above, in the power reception apparatus 20 of this embodiment, the switching devices of the full-bridge circuit (inverter) 22 that functions as a rectifier are operated in synchronization with the phase of the resonance current flowing through the power reception (secondary) resonator 23. This operation can eliminate the voltage drops at the body diodes, and thus the resonance voltage can be rectified to a DC voltage with higher efficiency.

As shown in FIG. 11, the voltage waveform of the terminal M detected in the detector 25 after inversion synthesis has the same phase as the voltage waveform of the terminal M in the detector 15 of the power transmission apparatus 10 shown in FIG. 6. Comparing FIG. 6 and FIG. 11, it can be seen that a 180° phase reversal occurs between the driving voltage applied to each of the switching devices (12a to 12d) of the full-bridge circuit (inverter) 12 of the power transmission apparatus 10 and the driving voltage applied to each of the switching devices (22a to 22d) of the full-bridge circuit (inverter) 22 of the power reception apparatus 20. In the wireless power transfer system of this embodiment, a resonance waveform is generated by coupling both resonators of the power transmission apparatus and the power reception apparatus, and the Hi/Lo of each of the four switching devices of the full-bridge circuit (inverter) is switched with the opposite polarity to the resonance waveform. Thus, power can be transmitted with higher efficiency.

b. Operation for Suspending Rectification and Power Transmission Operation

Figure 12:
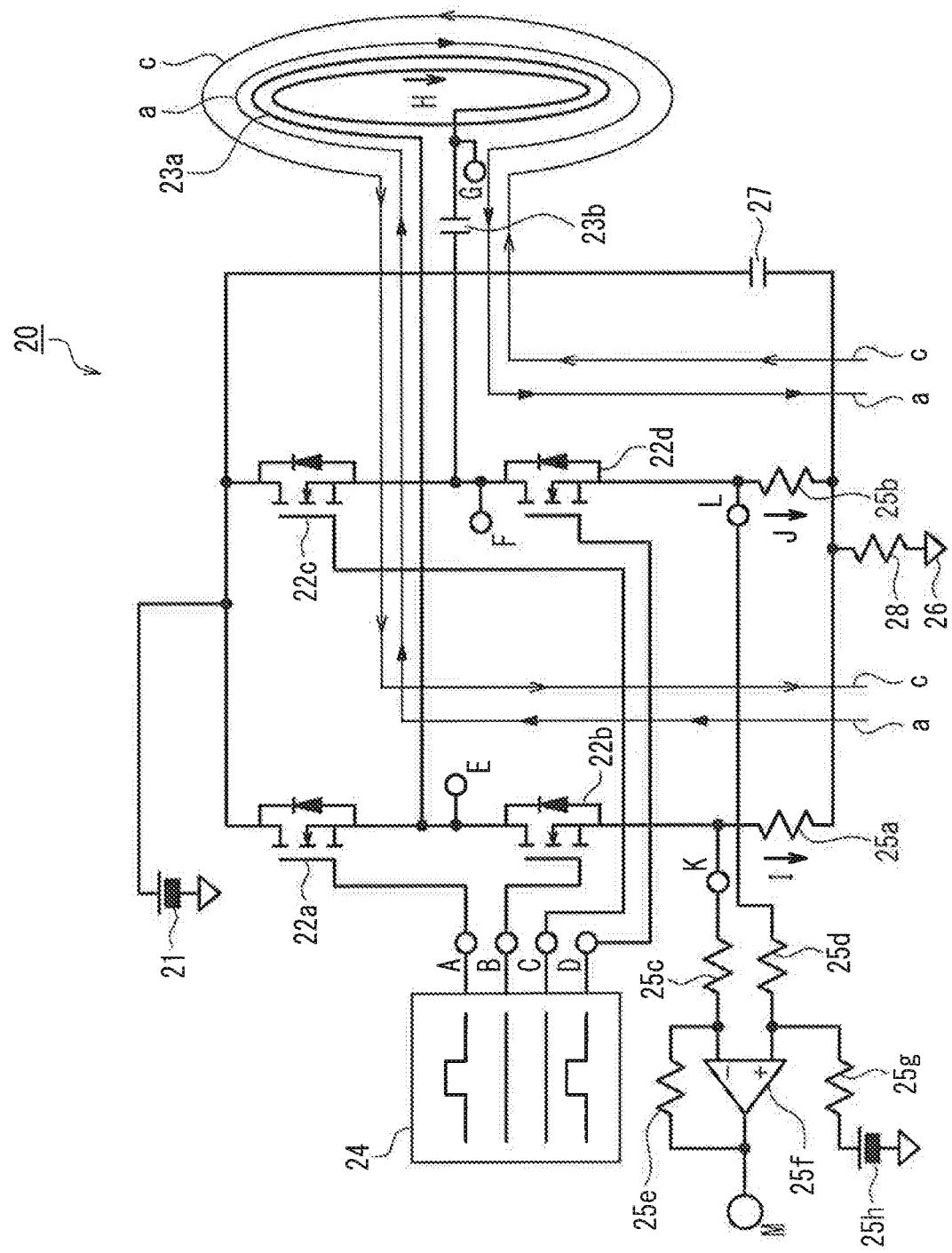
FIG. 12 is a diagram showing an operation in a power reception suspend mode when a wireless power transfer system of this embodiment is used as a power reception apparatus.

FIG. 12 is a circuit configuration diagram of the power reception apparatus of this embodiment for explaining the flow of a current to suspend a rectification operation of power transmitted from the power transmission apparatus.

Figure 13:
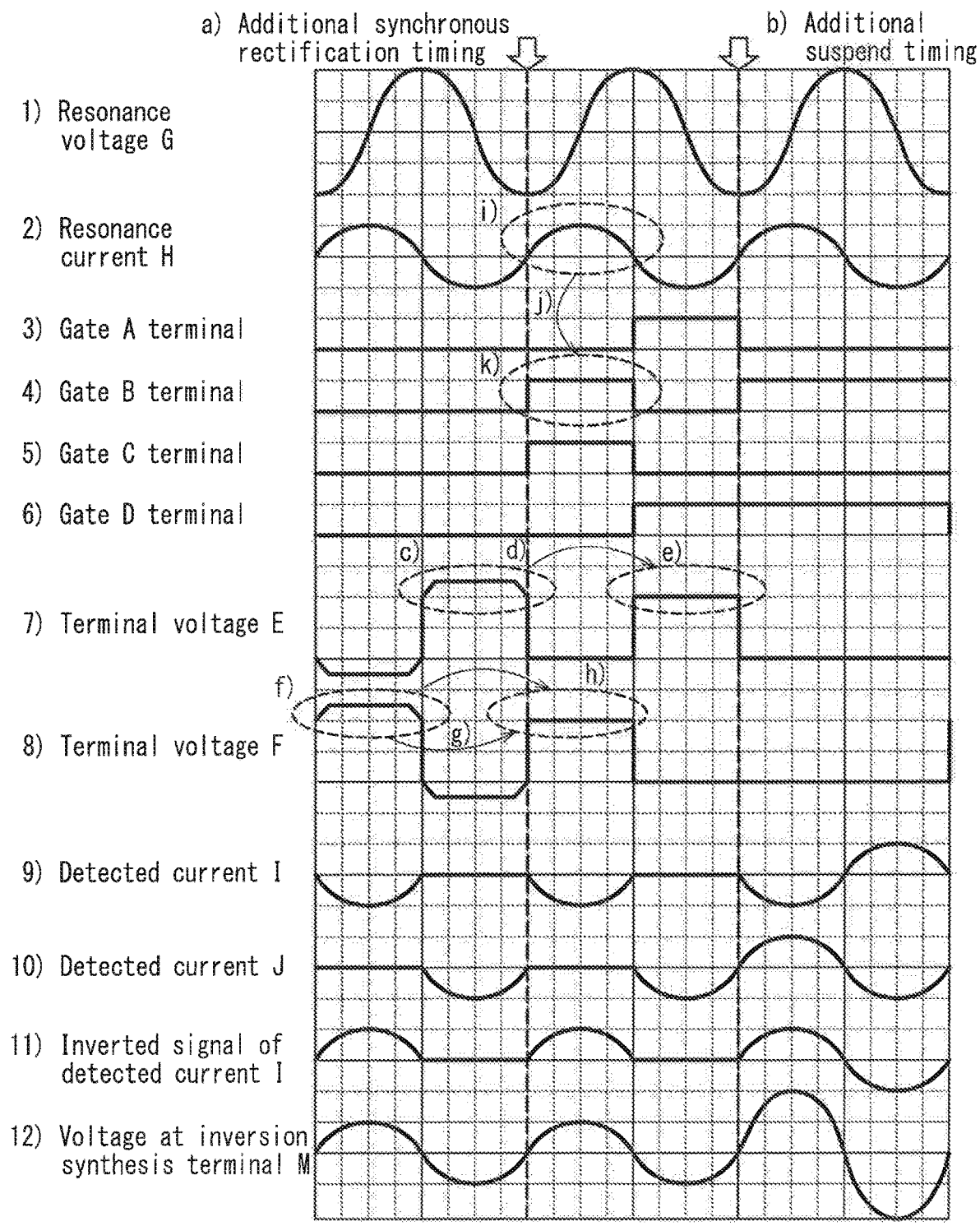
FIG. 13 is a timing chart showing an operation in a power reception suspend mode when a wireless power transfer system of this embodiment is used as a power reception apparatus.

FIG. 13 is a timing chart showing an operation to suspend the rectification of a current received by the power reception (secondary) resonator of the power reception apparatus.

For example, when the power supply 21 of the power reception apparatus 20 is a secondary battery, and the secondary battery is charged with the power received by the power reception (secondary) resonator 23, the power extracted from the power reception (secondary) resonator 23 may be reduced with an increase in the charge capacity of the secondary battery and this may lead to an increase in the resonance voltage of the resonant coil 23a and the resonant capacitor 23b of the power reception (secondary) resonator 23. In this case, it is necessary to suspend the rectification from the power reception (secondary) resonator 23 to the power supply 21.

The rectification can be suspended by the following operation. As shown in FIG. 13, the gate terminals B and D are set to Hi and the gate terminals A and C are set to Lo in the drive control circuit 24, and then the full-bridge circuit (inverter) 22 is controlled in such a way that the switching devices b and d located on the ground 26 side are turned ON and the switching devices a and c located on the power supply 21 side are turned OFF.

In this manner, the resonance current H flows only between the devices located on the ground side of the full-bridge circuit (inverter) 22 and the power reception (secondary) resonator 23, as indicated by the arrows a and c in FIG. 12. In the power reception apparatus of this embodiment, the detector 25 detects the current I and the current J flowing through the two devices located on the ground side of the full-bridge circuit (inverter) 22, respectively. Therefore, the resonance current indicated by the arrows a and c in FIG. 12 can be detected as the resonance current I and the resonance current J shown in FIG. 13.

In the power reception apparatus 20 of this embodiment, the current I flowing through the first resistor 25a is inverted and combined with the current J flowing through the second resistor 25b. Therefore, as shown in FIG. 13, the phase, i.e., the timing at which the resonance current becomes 0 is the same, but the voltage value in the terminal M is two times as high as the voltage value during normal reception of power or synchronous rectification. Thus, when the reception of power is resumed from the suspended state, the ON/OFF control of each switching device of the full-bridge circuit (inverter) 22 can be immediately restarted with the operation timing before the suspend according to the timing of the resonance current detected by the detector 25.

The detector may also detect the current flowing through the switching devices located on the power supply side of the full-bridge circuit (inverter). In this case, the terminals A and C are set to Hi and the terminals B and D are set to Lo in the drive control circuit, so that the resonance current H of the power reception (secondary) resonator is controlled to flow through the power supply side of the full-bridge circuit (inverter) 22. Thus, the resonant current waveform can be continuously detected during the suspend, and the power reception apparatus can be immediately restored to the power reception state from the suspended state. This operation is the same as that of the power transmission apparatus, as described above.

Figure 14:
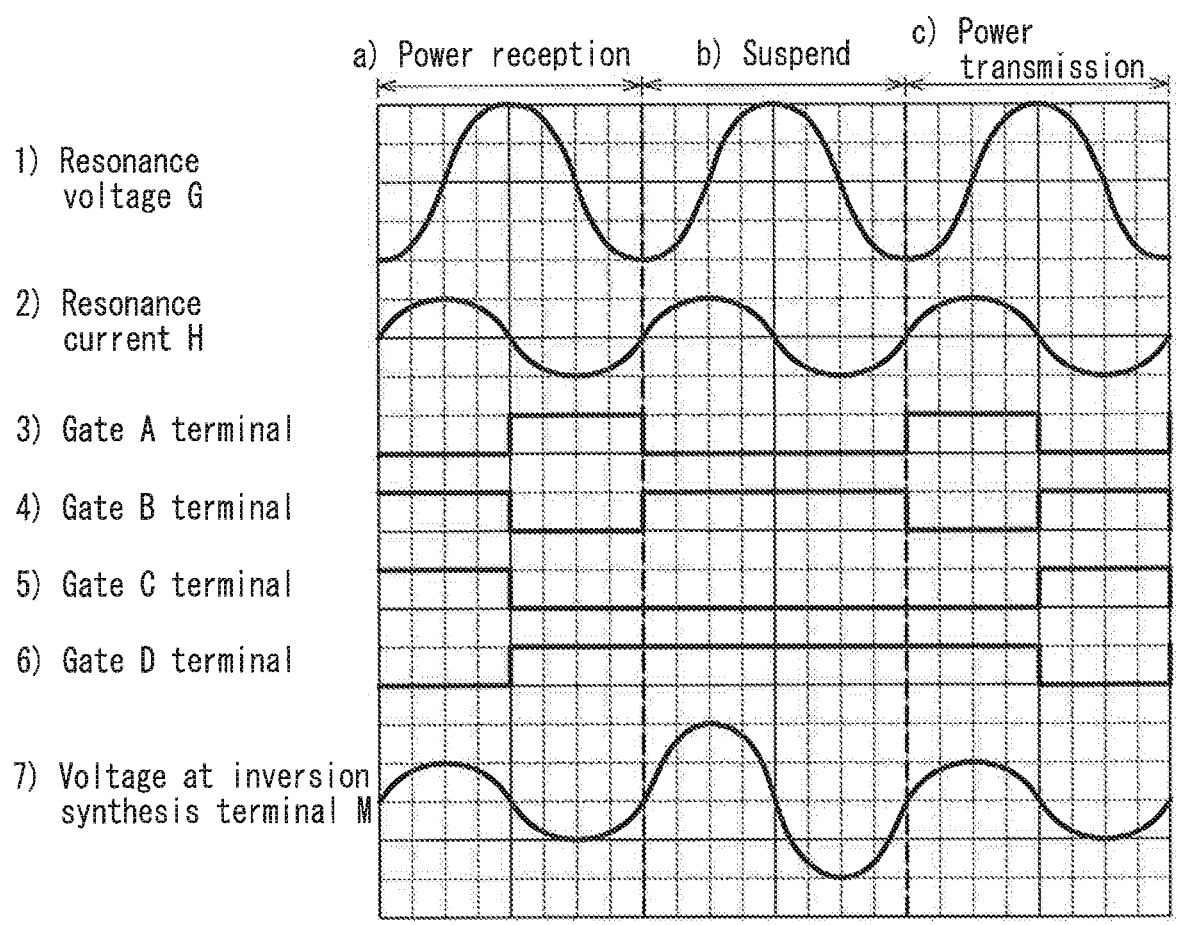
FIG. 14 is a timing chart showing operations in a power reception mode, a suspend mode, and a power transmission mode when a wireless power transfer system of this embodiment is used as a power reception apparatus.

FIG. 14 is a timing chart showing an operation in a power transmission mode to transmit to the power transmission apparatus the power remaining in the power reception (secondary) resonator after the power reception apparatus of this embodiment is brought into the suspended state.

As described above, a secondary battery may be used as the power supply 11 of the power transmission apparatus of this embodiment. In this case, if it is possible to transmit to the power transmission apparatus the power that remains in the power reception (secondary) resonator of the power reception apparatus after the transmission of power from the power transmission apparatus has been stopped, the power of the secondary battery as the power supply 11 can be recovered.

As shown in FIG. 14, in the suspended state, the voltages of the terminals B and D are set to Hi and the voltages of the terminals A and C are set to Lo, so that only the two switching devices 22b and 22d located on the ground 26 side of the full-bridge circuit (inverter) 22 are turned ON. Thereafter, the voltages of the terminals A and D are set to Hi and the voltages of the terminals B and C are set to Lo when the resonance current is "positive", and the voltages of the terminals B and C are set to Hi and the voltages of the terminals A and D are set to Lo when the resonance current is "negative". In this manner, the power reception apparatus is operated as a power transmission apparatus, and thus power can be transmitted from the power reception apparatus to the power transmission apparatus.

Like the power transmission apparatus described with reference to FIG. 9, in the power reception apparatus of this embodiment, the currents flowing through the two lower switching devices of the full-bridge circuit (inverter), respectively, are inverted and combined to provide the output of the detector. Therefore, as shown in FIG. 14, the detected resonance voltage waveform in the power transmission mode of the power reception apparatus is the same as that in the synchronous rectification operation in the power reception mode or that in the suspend mode. Thus, the power reception apparatus can smoothly switch between the power reception mode, the suspend mode, and the power transmission mode.

The control state in the power transmission mode of the power reception apparatus, in which the operating voltage pulse is applied from the drive control circuit 24 to each switching device of the full-bridge circuit (inverter) 22, is the same as that in the operation of the full-bridge circuit (inverter) 12 of the power transmission apparatus 10, as descried above.

When the power reception apparatus of this embodiment is used as a power transmission apparatus, the received current by the power reception (secondary) resonator can be full-wave rectified and converted to a DC current by using the body diodes of the switching devices of the full-bridge circuit (inverter) that controls the current flow to the power transmission (primary) resonator.

Moreover, the ON/OFF of each switching device of the full-bridge circuit (inverter) can be controlled in accordance with the phase of the resonance current in the power reception (secondary) resonator. Therefore, the power reception apparatus can perform synchronous rectification to avoid the voltage drops at the body diodes of the switching devices, and can receive power with high power reception efficiency.

Further, the detector detects each of the currents flowing through the two switching devices located on the ground side of the full-bridge circuit (inverter). Thus, the power reception apparatus can be configured, at a low cost, to perform the control in the suspend mode that suspends the power reception operation and the control in the power transmission mode that transmits power from the power reception apparatus to the power transmission apparatus based on the resonance voltage waveform of the same continuous phase.

[Use as Bidirectional Power Transmission/Reception Apparatus]

As described above, the wireless power transfer system of this embodiment can be used as both the power transmission apparatus and the power reception apparatus with the same configuration. This makes it possible to perform bidirectional wireless power transmission between a pair of devices.

Figure 15:
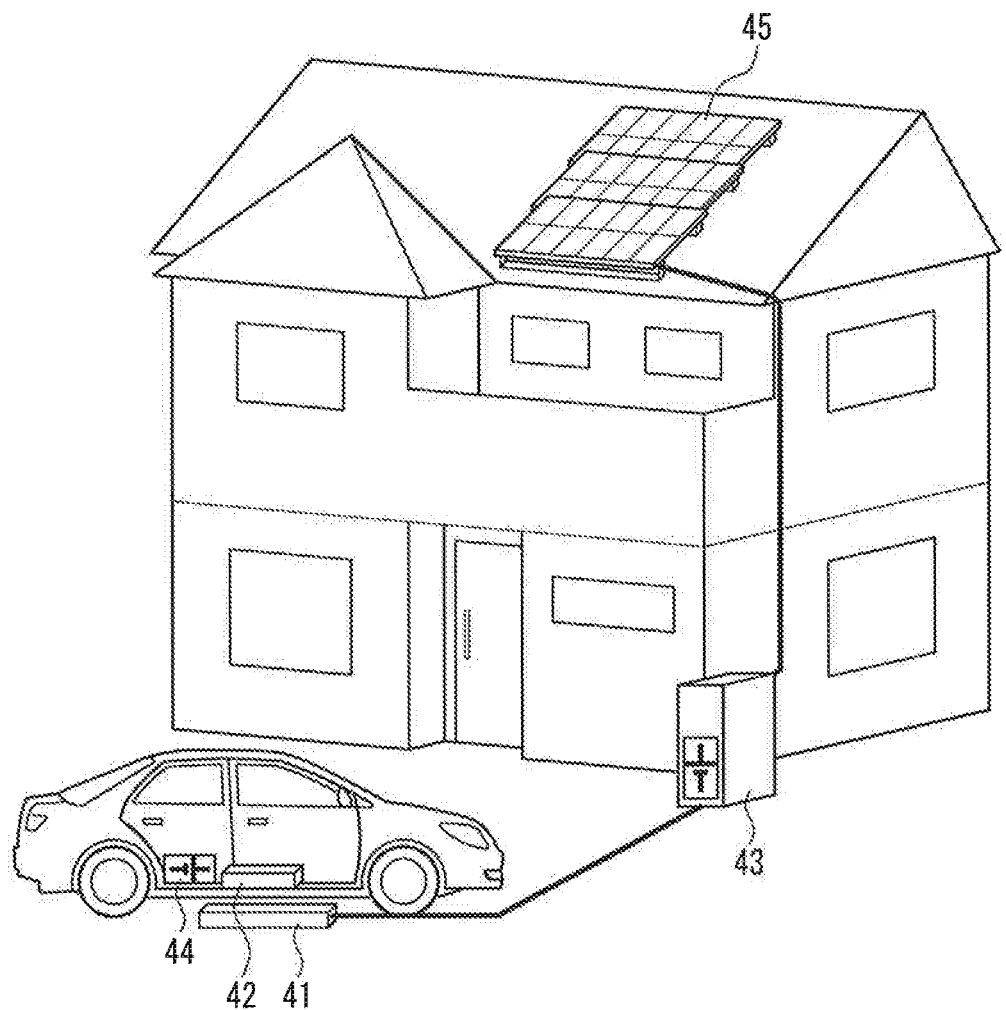
FIG. 15 is an image diagram showing an example of bidirectional power transmission using a wireless power transfer system of this embodiment as both a power transmission apparatus and a power reception apparatus.

For example, as shown in FIG. 15, power is generated by, e.g., a solar panel 45 for home use and stored in a storage battery 43. The power can be transmitted from the storage battery 43 to a secondary battery 44 mounted on an electric vehicle by using two wireless power transfer systems 41 and 42. On the other hand, if power transmission from the power company is stopped during a disaster such as an earthquake, the power may be transmitted from the device 42 to the device 41 in a direction opposite to the direction in which the secondary battery 44 has been charged. Then, the power stored in the secondary battery 44 of the vehicle can be used in combination with the power supplied from the solar panel 45 as a power source for operating home electric appliances.

Moreover, the wireless power transfer system of this embodiment can be used not only for power transmission between two wireless power transfer systems, but also for power transmission between three or more wireless power transfer systems. For example, the wireless power transfer system of this embodiment may be employed as a power transmission apparatus that is to be mounted on a submarine or a helicopter. In this case, when the power transmission apparatus is used at the base, it can be operated as a power reception apparatus for receiving power from another wireless power transfer system. Then, the power transmission apparatus can serve to transmit power to a power reception apparatus that is connected to an operating power supply of an apparatus located in a place that is difficult to reach such as the sea floor or the mountain top.

In the above embodiment, the wireless power transfer system of the present disclosure is described as a bidirectional wireless power transfer system that may be used as both a power transmission apparatus and a power reception apparatus.

The configuration of this embodiment including the power supply, the full-bridge circuit (inverter), the resonator, the drive control circuit, and the detector has a particular effect of being able to control various operations of the power transmission apparatus alone or the power reception apparatus alone.

For this reason, the wireless power transfer system of the present disclosure can be used as a power transmission apparatus for bidirectional power transmission, and can also be suitably used as a power transmission apparatus for only power transmission or a power reception apparatus for only power reception.

In the above embodiment, all the operations of the power transmission apparatus, including self-oscillation control, control for increasing and decreasing the resonance current, PWM control, suspend control, and recovery control, are performed by the drive control circuit. However, when the wireless power transfer system of the present disclosure is used as a power transmission apparatus, it is not necessary to perform all these operations. Needless to say, the power transmission apparatus can perform only some of the above various operations.

Similarly, when the wireless power transfer system of the present disclosure is used as a power reception apparatus, it is not necessary to perform all the operations, including synchronous rectification control, suspend control, and transmission control from the power reception apparatus. The power reception apparatus can perform only some of the above operations.

In the above embodiment, the full-bridge circuit (inverter) including the switching devices composed of MOSFETs is described as an example of a switching circuit. In addition to the MOSFETs, the switching circuit may include various devices that are used as switching devices of the conventional power supply circuit, such as other transistor devices and IGBTs.

In the wireless power transfer system of the present disclosure, an device with a body diode such as MOSFET is preferably used because the received current needs to be rectified in the power reception apparatus. For example, when a switching device without a body diode such as IGBT is used, a diode is additionally arranged in parallel with the switching device so that a current flows only in the direction from the ground side to the power supply side. When the resistance component of the body diode is large, including the use of MOSFET as a switching device, it is preferable that a diode having a smaller resistance component is connected in parallel with the switching device so that the power consumption of the device can be reduced.

The switching circuit is not limited to the full-bridge circuit (inverter) as described above, and may be a half-bridge circuit. However, when the wireless power transfer system including a half-bridge circuit is used as a power transmission apparatus, the self-oscillation operation or the like may be successfully performed, but only a half cycle of the resonance current can be detected by the detector during the PWM control. Therefore, signal processing may be required to produce a resonant current waveform for the remaining half cycle by inversion synthesis. On the other hand, when the wireless power transfer system including a half-bridge circuit is used as a power reception apparatus, the received current is half-wave rectified, and thus the power reception efficiency is reduced as compared to full-wave rectification using the full-bridge circuit (inverter) as a switching circuit.

The circuit configuration of the switching circuit including a plurality of switching devices is not limited to a so-called bridge connection configuration such as the full-bridge circuit (inverter) and the half-bridge circuit, as described above. The switching circuit may have other circuit configurations as long as the switching devices can be individually controlled to change the direction of a current applied to the power transmission (primary) resonator, and also the resonance current can be rectified when the switching circuit is used in the power reception apparatus.

INDUSTRIAL APPLICABILITY

The power transmission apparatus of the present disclosure is useful as a wireless power transfer system that has a simple configuration, but is still able to transmit power with high efficiency and high safety. Moreover, the power transmission apparatus of the present disclosure can also be used as a power transmission and reception apparatus that can perform bidirectional power transmission and serve as both a power transmission apparatus and a power reception apparatus, or used as either a power transmission apparatus that performs only power transmission or a power reception apparatus that performs only power reception.

The invention claimed is:

1. A wireless power transfer system that is a power transmission apparatus that is able to perform bidirectional wireless power transmission, comprising:
a power supply;
a switching circuit composed of a full-bridge circuit that includes a plurality of switching devices;
a resonator that includes a coil and a capacitor;
a drive control circuit that controls an ON/OFF operation of each switching device of the switching circuit; and
a detector that detects a resonance current flowing through the switching circuit,
wherein the detector has a first resistor and a second resistor that respectively detect a current flowing through the switching devices located on a ground side of the full-bridge circuit, and
the drive control circuit controls the ON/OFF of each switching device of the switching circuit to perform a power transmission operation or a power reception operation based on a resonant current waveform obtained from the current flowing through the switching devices located on the ground side of the full-bridge circuit.

2. The wireless power transfer system according to claim 1, wherein when the wireless power transfer system is used as a power transmission apparatus, the drive control circuit controls the ON/OFF operation of each switching device to supply a current in a predetermined direction from the switching circuit to the resonator in accordance with a phase of the resonant current waveform detected by the detector.

3. The wireless power transfer system according to claim 1, wherein when the wireless power transfer system is used as a power transmission apparatus, the drive control circuit controls a pulse width of a drive pulse for controlling the ON/OFF operation of each switching device to be short in accordance with a phase of the resonant current waveform detected by the detector.

4. The wireless power transfer system according to claim 1, wherein when the wireless power transfer system is used as a power transmission apparatus, the drive control circuit suspends the transmission of power from the resonator by turning ON only any of the switching devices located on either the power supply side or a ground side of the switching circuit.

5. The wireless power transfer system according to claim 1, wherein when the wireless power transfer system is used as a power transmission apparatus, the drive control circuit controls the ON/OFF operation of each switching device to supply a current from the resonator to the switching circuit in accordance with a phase of the resonant current waveform detected by the detector.

6. The wireless power transfer system according to claim 1, wherein when the wireless power transfer system is used as a power reception apparatus, the drive control circuit controls the ON/OFF operation of each switching device to rectify a current output from the resonator in accordance with the phase of the resonant current waveform detected by the detector.

7. The wireless power transfer system according to claim 1, wherein when the wireless power transfer system is used as a power reception apparatus, the drive control circuit suspends the reception of power by the resonator by turning ON only any of the switching devices located on either the power supply side or the ground side of the switching circuit.

8. The wireless power transfer system according to claim 1, wherein when the wireless power transfer system is used as a power reception apparatus, the drive control circuit controls the ON/OFF operation of each switching device to supply a current from the switching circuit to the resonator in accordance with the phase of the resonant current waveform detected by the detector.

9. The wireless power transfer system according to claim 1, wherein the detector detects a current flowing through the switching devices located on the ground side of the switching circuit.

10. A power transmission apparatus that transmits power in a wireless manner, comprising:
a power supply;
a switching circuit composed of a full-bridge circuit that includes a plurality of switching devices;
a power transmission resonator that includes a coil and a capacitor;
a drive control circuit that controls an ON/OFF operation of each switching device of the switching circuit; and
a detector that detects a resonance current flowing through the switching circuit,
wherein the detector has a first resistor and a second resistor that respectively detect a current flowing through the switching devices located on a ground side of the full-bridge circuit, and
the drive control circuit controls the ON/OFF of each switching device of the switching circuit to perform a power transmission operation based on a resonant current waveform obtained from the current flowing through the switching devices located on the ground side of the full-bridge circuit.

11. A power reception apparatus that receives power in a wireless manner, comprising:
a power supply;
a switching circuit composed of a full-bridge circuit that includes a plurality of switching devices;
a power reception resonator that includes a coil and a capacitor;
a drive control circuit that controls an ON/OFF operation of each switching device of the switching circuit; and
a detector that detects a resonance current flowing through the switching circuit,
wherein the detector has a first resistor and a second resistor that respectively detect a current flowing through the switching devices located on a ground side of the full-bridge circuit, and
the drive control circuit controls the ON/OFF of each switching device of the switching circuit to perform a power reception operation based on a resonant current waveform obtained from the current flowing through the switching devices located on the ground side of the full-bridge circuit.

* * * * *